(12) United States Patent
Shijo

(10) Patent No.: US 11,056,927 B2
(45) Date of Patent: Jul. 6, 2021

(54) INDUCTOR DEVICE, NON-CONTACT POWER CHARGING/SUPPLYING SYSTEM AND ELECTRIC VEHICLE

(71) Applicant: KABUSHIKI KAISHA TOSHIBA, Tokyo (JP)

(72) Inventor: Tetsu Shijo, Tokyo (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 163 days.

(21) Appl. No.: 16/295,140

(22) Filed: Mar. 7, 2019

(65) Prior Publication Data
US 2020/0021147 A1 Jan. 16, 2020

(30) Foreign Application Priority Data
Jul. 11, 2018 (JP) .............................. JP2018-131795

(51) Int. Cl.
*H02J 7/00* (2006.01)
*H02J 50/70* (2016.01)
(Continued)

(52) U.S. Cl.
CPC .............. *H02J 50/70* (2016.02); *B60L 53/12* (2019.02); *H01F 27/24* (2013.01); *H01F 27/28* (2013.01);
(Continued)

(58) Field of Classification Search
CPC .. H02J 50/70; H02J 7/025; H02J 50/12; H02J 7/0042; H02J 2310/48; H02J 50/402;
(Continued)

(56) References Cited

U.S. PATENT DOCUMENTS

| 8,441,154 B2 | 5/2013 | Karalis et al. |
| 2013/0093255 A1* | 4/2013 | Jung ........................ H02J 5/005 307/104 |

(Continued)

FOREIGN PATENT DOCUMENTS

| JP | 2013-523066 A | 6/2013 |
| JP | 2014-103749 A | 6/2014 |

(Continued)

OTHER PUBLICATIONS

Ida et al., "Large Air Gap Contactless Power Transfer System," JSAE, 20125237:5-8 (May 23, 2012).
Laouamer et al., "A Multi-Resonant Converter for Non-Contact Charging with Electromagnetic Coupling," IECON, 2:792-797 (Nov. 1997).

*Primary Examiner* — Zixuan Zhou
(74) *Attorney, Agent, or Firm* — Finnegan, Henderson, Farabow, Garrett & Dunner L.L.P.

(57) ABSTRACT

According to one embodiment, an inductor device includes a first pad and a second pad. The first pad includes a first compensation part located in a first direction side and a first inductor part located in a second direction side. The second direction is an opposite direction of the first direction. The second pad includes a second compensation part located in the second direction side and a second inductor part located in the first direction side. The first compensation part and the second compensation part each include a compensation capacitor. The first inductor part includes a first core and a first coil winded around the first core. The second inductor part includes a second core and a second coil winded around the second core.

15 Claims, 18 Drawing Sheets

(51) Int. Cl.
  *H02J 7/02* (2016.01)
  *H02J 50/12* (2016.01)
  *B60L 53/12* (2019.01)
  *H01F 27/28* (2006.01)
  *H01F 38/14* (2006.01)
  *H02M 3/08* (2006.01)
  *H01F 27/24* (2006.01)
(52) U.S. Cl.
  CPC ............ *H01F 38/14* (2013.01); *H02J 7/0042* (2013.01); *H02J 7/025* (2013.01); *H02J 50/12* (2016.02); *H02M 3/08* (2013.01)
(58) Field of Classification Search
  CPC .... B60L 53/12; B60L 2270/147; H01F 27/28; H01F 38/14; H01F 27/24; H02M 3/08; Y02T 90/14; Y02T 10/7072; Y02T 10/70
  USPC .......................................... 320/108; 307/104
  See application file for complete search history.

(56) References Cited

U.S. PATENT DOCUMENTS

| 2014/0139036 | A1 | 5/2014 | Shijo et al. | |
| 2015/0362614 | A1* | 12/2015 | Obayashi | H02J 50/12 324/207.17 |
| 2017/0012477 | A1 | 1/2017 | Shijo et al. | |
| 2017/0309395 | A1* | 10/2017 | Shiraki | B60L 50/13 |

FOREIGN PATENT DOCUMENTS

| JP | 5592124 B2 | 9/2014 |
| JP | 6063719 B2 | 1/2017 |
| JP | 2018-41796 A | 3/2018 |
| JP | 6302549 B2 | 3/2018 |
| WO | WO 2015/198997 A1 | 12/2015 |
| WO | WO 2015/189976 A1 | 4/2017 |

* cited by examiner

US 11,056,927 B2

INDUCTOR DEVICE, NON-CONTACT POWER CHARGING/SUPPLYING SYSTEM AND ELECTRIC VEHICLE

CROSS-REFERENCE TO RELATED APPLICATIONS

This application is based upon and claims the benefit of priority from Japanese Patent Application No. 2018-131795, filed on Jul. 11, 2018; the entire contents of which are hereby incorporated by reference.

FIELD

Embodiments described herein relate generally to an inductor device, a non-contact power charging/supplying system and an electric vehicle (EV).

BACKGROUND

In non-contact power charging/supplying systems, inductor devices are installed in both the transmitting side (primary side) and the receiving side (secondary side). Each of the inductor devices includes a plurality of inductors. Thereby, the transmitted electric power can be increased. Also, the rapid charging of secondary batteries becomes possible. However, the intensity of leakage magnetic fields needs to be reduced, considering electromagnetic interference.

By providing currents with opposite phases to each inductor or by winding the coil in opposite directions, the leakage magnetic fields from each inductor can be cancelled out. Also, if the distances between the inductors are shorter, the attenuations of magnetic fields become approximately equal, increasing the cancellation effect. However, if either the inductor devices include the compensation capacitor, the area of devices may increase depending on the compensation capacitor which is used. Therefore, there are cases when the distance between the inductors in the inductor device cannot be shortened.

DETAILED DESCRIPTION

According to one embodiment, an inductor device includes a first pad and a second pad. The first pad includes a first compensation part located in a first direction side and a first inductor part located in a second direction side. The second direction is an opposite direction of the first direction. The second pad includes a second compensation part located in the second direction side and a second inductor part located in the first direction side. The first compensation part and the second compensation part each include a compensation capacitor. The first inductor part includes a first core and a first coil winded around the first core. The second inductor part includes a second core and a second coil winded around the second core.

Hereinafter, embodiments of the present invention will be described in reference to the drawings.

First Embodiment

Figure 1:
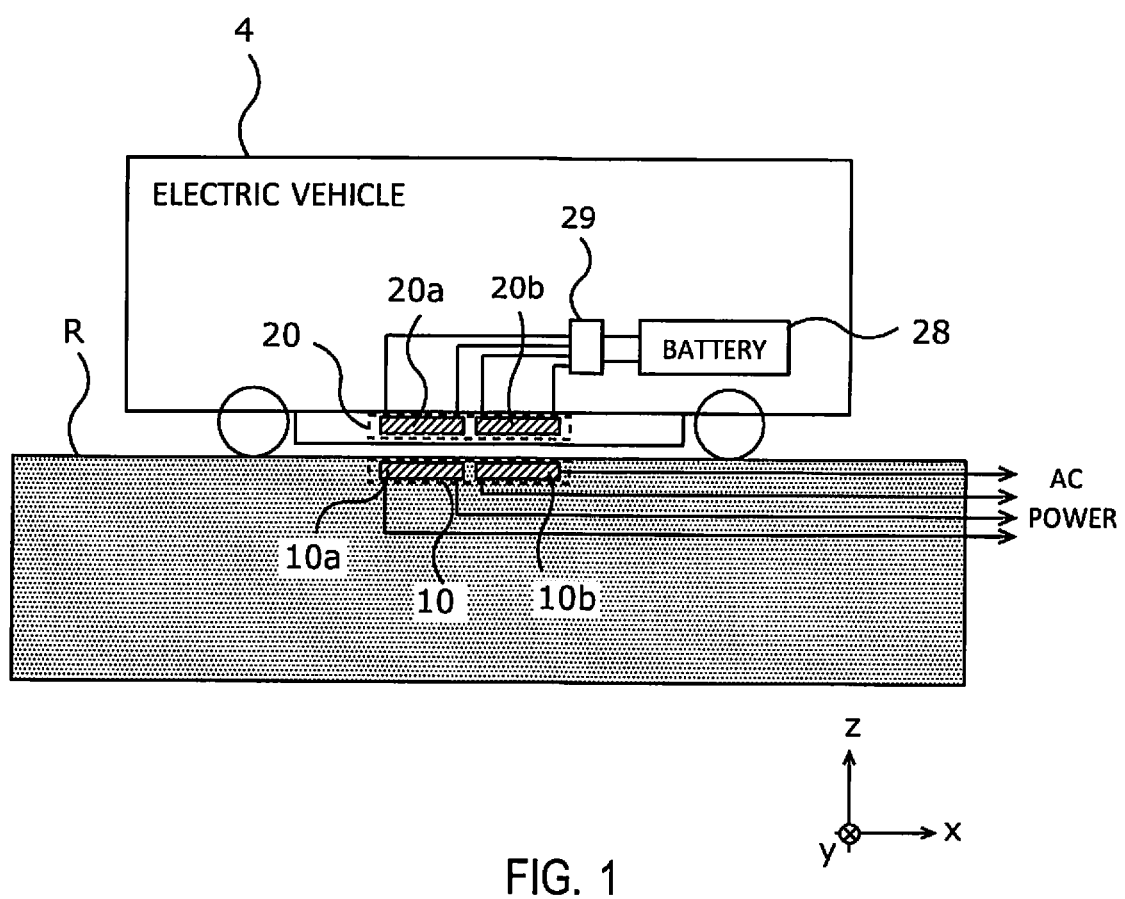
FIG. 1 is a diagram describing an example configuration of a non-contact power charging/supplying system according to a first embodiment.

FIG. 1 is a diagram describing an example configuration of a non-contact power charging/supplying system according to a first embodiment. In the non-contact power charging/supplying system of FIG. 1, electric power is provided to the electric vehicle 4 on the road R. A transmission pad 10a and a transmission pad 10b are embedded in the road R as the inductor device 10 of the transmitting side (primary side). Both the transmission pad 10a and the transmission pad 10b are electrically connected to the AC power charging/supply. In the bottom of the electric vehicle 4, the reception pad 20a and the reception pad 20b are placed as the inductor device 20 of the receiving side (secondary side).

During transmission of electric power, the transmission pad 10a is coupled electromagnetically to the reception pad 20a in the other side. During transmission of electric power, the transmission pad 10b is coupled electromagnetically to the reception pad 20b in the other side. The transmission pads 10a, 10b and the reception pads 20a and 20b each include an inductor. Specifically, the inductors which are facing to each other can be coupled to each other by electromagnetic induction or magnetic resonance. Thereby, transmission of electric power becomes possible.

The distance between the inductors which are coupled during the transmission of electric power is not limited. However, by making the distance between the inductors of the transmitting side and the receiving side shorter, the transmission efficiency can be improved. The configuration of FIG. 1 is only an example. Thus, it is possible to implement the inductor devices in locations other than the bottom of the electric vehicle. For example, in one embodiment, the inductor device is implemented on the sides of the electric vehicle.

The AC power received by the reception pads 20a and 20b are converted to DC power by a circuit element 29 including a rectifier circuit. Then, the DC power is provided to a battery 27. A DC-DC converter can be implemented in the circuit element 29. Thereby, the voltage or the current of the electric power supplied to the battery 27 can be adjusted. The battery 27 is a secondary battery. Examples of secondary batteries include lithium-ion batteries and lead-acid batteries. However, the type of secondary battery is not limited.

The transmitting pad in the primary side can be implemented in the road (ground) of parking spaces, bus-stops or garages. However, the location of the transmitting pad is not limited. Examples of electric vehicles include buses, trucks and automobiles with rubber tires. The electric vehicle can be a moving body such as railway vehicles, street cars or monorail trains. The electric vehicle can be a car or an EV bus driven by electric power. Also, the electric vehicle can be a hybrid vehicle which is driven with a combination of an internal-combustion system and electric power. The electric vehicle can be a gasoline-powered vehicle or a diesel car with at least part of the equipment installed in the vehicle driven by electric power.

In FIG. 1, electric power was provided to the electrical vehicle. However, electric power can be provided to other devices and machines. For example, electric power can be provided to moving bodies such as construction machines, robots, ships, airplanes and drones.

Figure 2:
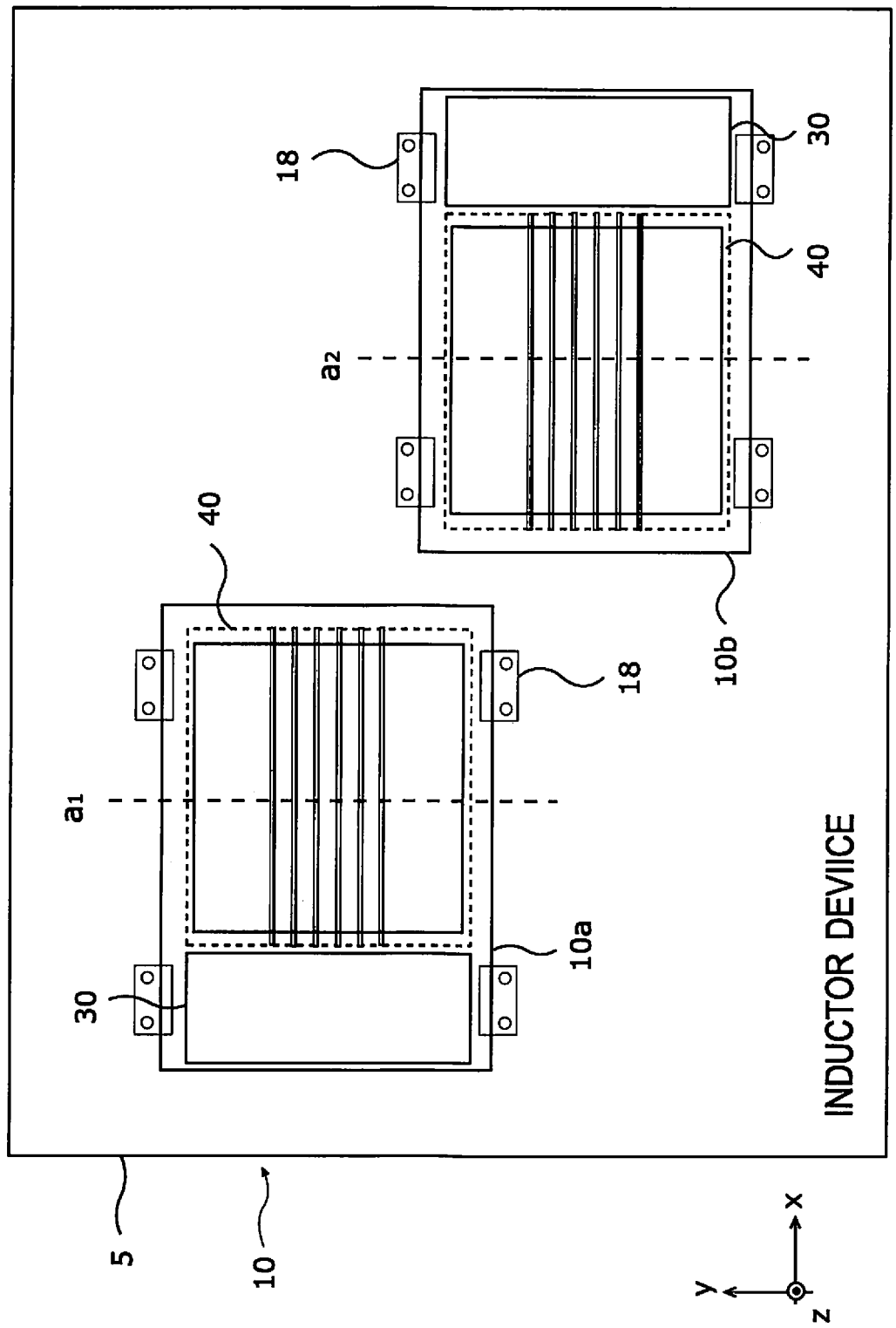
FIG. 2 is a plan view diagram describing an example configuration of an inductor device including a plurality of transmission pads.
Figure 5:
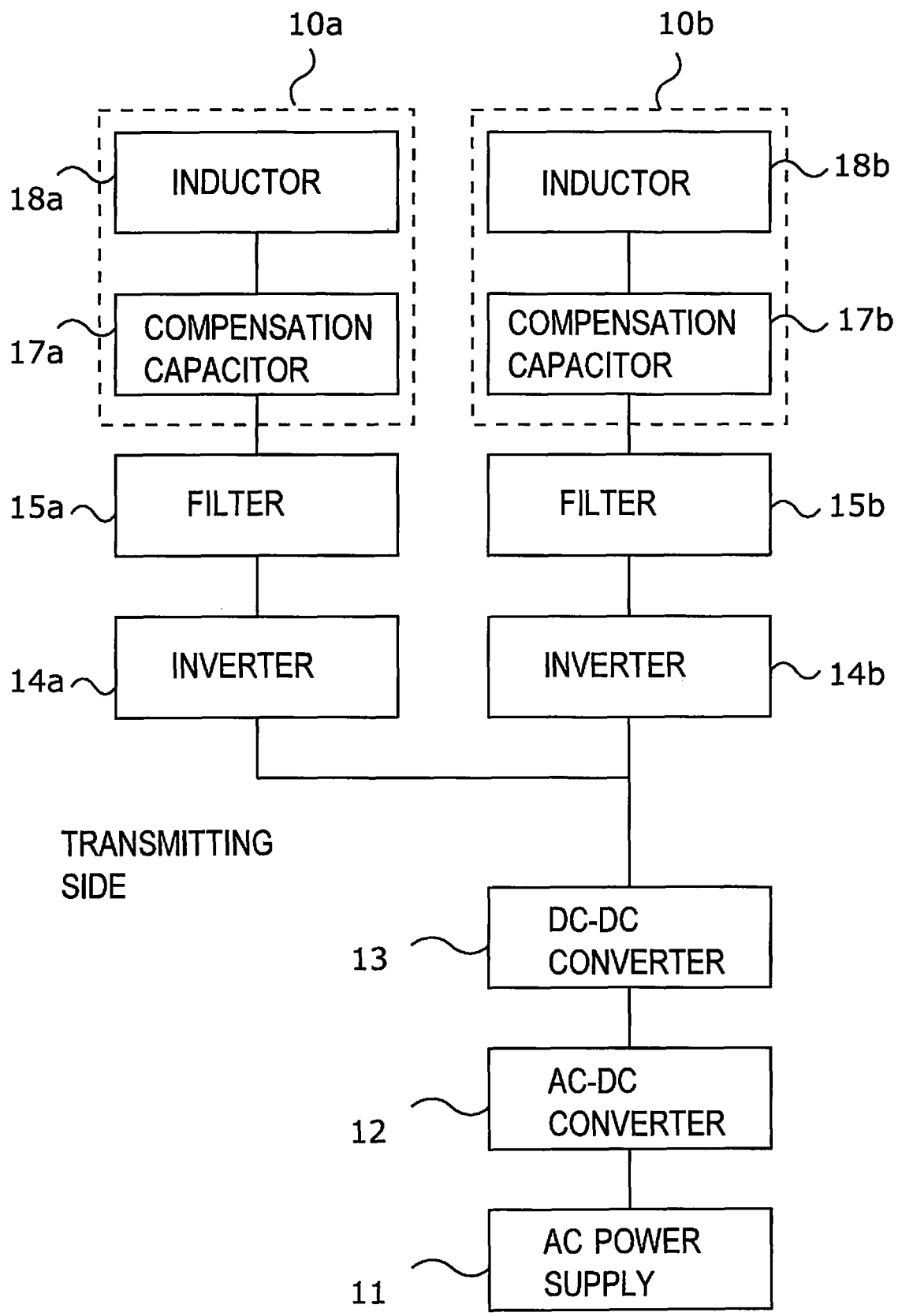
FIG. 5 is a diagram describing a configuration example of the transmitting side in the non-contact power charging/supplying system.

FIG. 2 is a plan view diagram describing an example configuration of an inductor device including a plurality of transmission pads. The inductor device 10 includes a body 5, a transmission pad 10a and a transmission pad 10b. The body 5 is an approximately plate-shaped object. The body 5 can be formed with materials with high thermal conductivity. Examples of materials with high thermal conductivity include various metals. However, the type of materials used for forming the body 5 is not limited. The body 5 in FIG. 5 is approximately plan view rectangular shaped. However, the shape of the body 5 described in FIG. 2 is only an example. Thus, the shape of the body 5 is not limited.

The transmission pad 10a and the transmission pad 10b can be placed so that they are placed in approximately the same plane. Here, the plane can be a virtual plane which is used to describe the geometrical coordination of structures. In the example of FIG. 2, the transmission pad 10a and the transmission pad 10b are located in the same plane (for example, plane x-y). The plane x-y is an example of the first plane. The transmission pad 10a and the transmission pad 10b can be fixed on the surface of the body 5 by using a plurality of jigs 18.

However, the above locations of the transmission pad 10a and the transmission pad 10b are only examples. For example, the transmission pad 10a and the transmission pad 10b can be located so that they are approximately parallel to a surface (for example, a first surface). Then, the heights (coordinate values in the z-axis direction) of the transmission pad 10a and the transmission pad 10b can be different. Also, the heights (coordinate values in the z-axis direction) of the transmission pad 10a and the transmission pad 10b can be equal. When the coordinate values in the z-axis direction of the transmission pad 10a and the transmission pad 10b are equal, the transmission pads are placed in the same surface.

When electric power is transmitted, the transmission pad 10a is located so that it is facing the reception pad 20a in the secondary side. When electric power is transmitted, the transmission pad 10b is located so that it is facing the reception pad 20b in the secondary side.

Both the transmission pad 10a and the transmission pad 10b include a compensation part 30 and an inductor part 40. The compensation part 30 includes a compensation capacitor. The inductor part 40 includes a core and a coil (wiring) winded around the core. Thus, the inductor part 40 is configured to operate as an inductor. Currents with inverse phases are provided to the coils of the transmission pad 10a and the transmission pad 10b. Therefore, the magnetic field generated by the transmission pad 10a and the magnetic field generated by the transmission pad 10b have opposite directions. Thereby, the leakage magnetic fields of the inductor devices cancel out with each other, reducing the intensity of the leakage magnetic field.

It is possible to wind the coils of the inductor in the transmission pad 10a and the inductor in the transmission pad 10b to the opposite direction. Then, the magnetic field generated by the inductor of the transmission pad 10a and the magnetic field generated by the inductor of the transmission pad 10b would have opposite directions.

The line $a_1$ in FIG. 2 is perpendicular to the direction the coil is winded in the inductor part 40 of the transmission pad 10a. Also, the line $a_2$ in FIG. 2 is perpendicular to the direction the coil is winded in the inductor part 40 of the transmission pad 10b. The transmission pad 10a and the transmission pad 10b are placed so that the line $a_1$ and the line $a_2$ are approximately parallel. By locating the transmission pads according to the configuration of FIG. 2, the magnetic field generated by the inductor of the transmission pad 10a and the magnetic field generated by the inductor of the transmission pad 10b can cancel out with each other.

In FIG. 2, an inductor device 10 including the transmission pad 10a and the transmission pad 10b is described. The inductor device 10 is located in the primary side (transmitting side). For the inductor device 20 located in the secondary side (receiving side), an inductor device with a symmetric configuration with respect to the plane x-y can be used. However, the configuration of the inductor device 20 which is facing the inductor device 10 does not have to be plane symmetric to the inductor device 10.

However, efficient transmission of power is possible if the region corresponding to the inductor part 40 of the transmission pad 10a and the region corresponding to the inductor part 40 of the reception pad 20a overlap, when viewed from the z-axis direction. Similarly, efficient transmission of power is possible, if the region corresponding to the inductor part 40 of the transmission pad 10b and the region corresponding to the inductor part 40 of the reception pad 20b overlap, when viewed from the z-axis direction. Thus, the efficiency of electric power transmission can be improved by reducing the misalignment between the transmission pad and the reception pad. However, the region corresponding to the transmission pad and the region corresponding to the reception pad do not have to match perfectly, when observed from the z-axis direction.

In the following, the transmission pad and the reception pad are referred collectively by the term, transmission/reception pad. In a transmission/reception pad is referred without distinguishing the transmission pad and the reception pad, both the transmission pad and the receiving pad are included. Details of the transmission/reception pad are described later.

By locating a plurality of transmission/reception pads in the inductor device, transmission of large electric powers becomes possible. In the examples of FIG. 1 and FIG. 2, the inductor devices of the transmitting side and the receiving side each include two transmission/reception pads. However, this number of the transmission/reception pads is only an example. Thus, a greater number of transmission/reception pads can be located in the inductor devices of the transmitting side and the receiving side.

Figure 3:
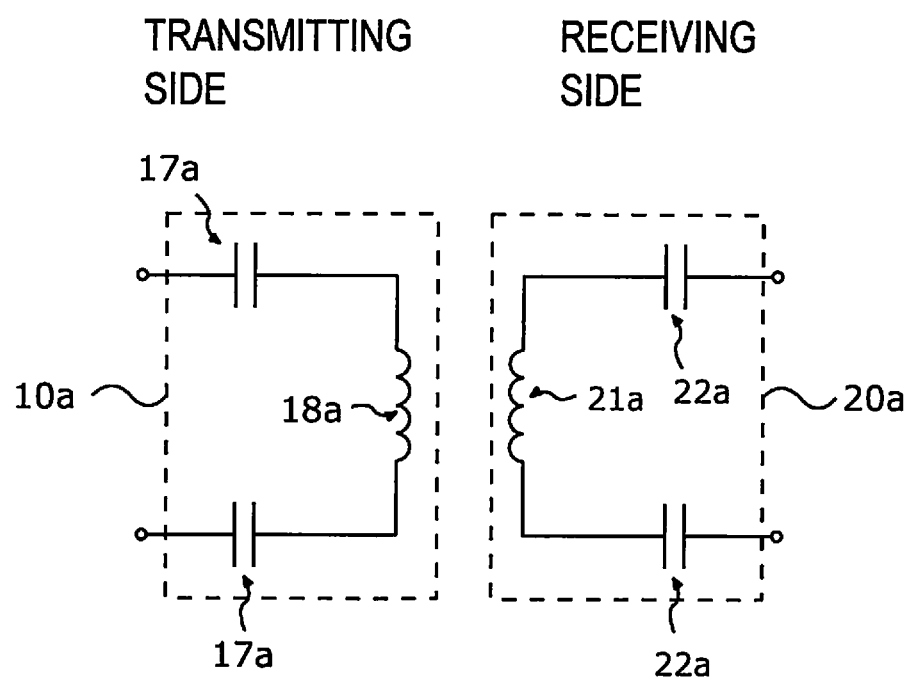
FIG. 3 is a diagram describing a first example of connections of compensation capacitors in the non-contact power charging/supplying system.
Figure 4:
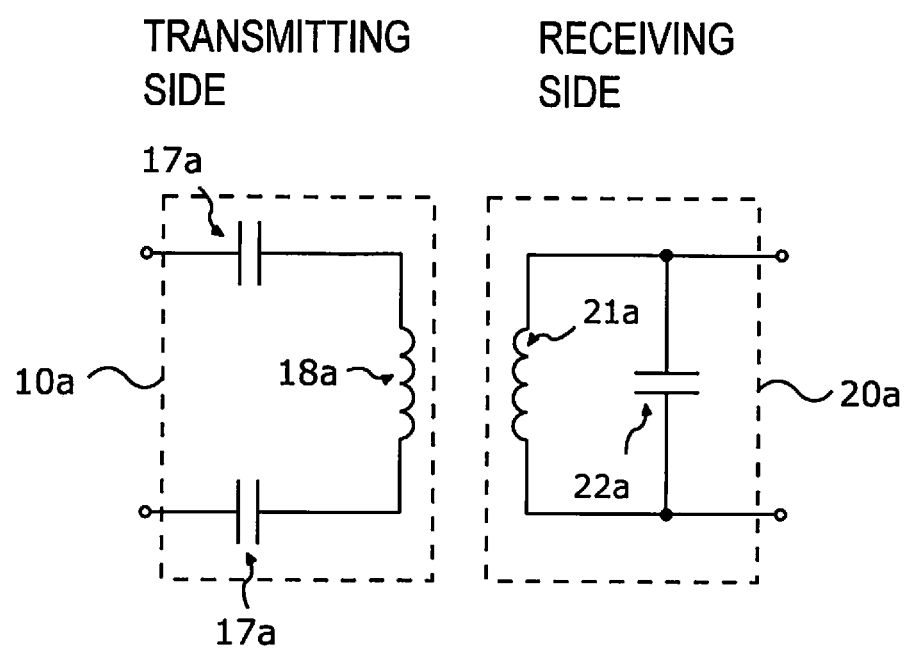
FIG. 4 is a diagram describing a second example of connections of compensation capacitors in the non-contact power charging/supplying system.

FIG. 3 and FIG. 4 are diagrams describing examples of connections of compensation capacitors in the non-contact power charging/supplying system. FIG. 3 and FIG. 4 include circuit diagrams of the transmission pad 10a and the reception pad 20a of the non-contact power charging/supplying system. As described in FIG. 3 and FIG. 4, the transmission pad 10a includes an inductor 18a and a compensation capacitor 17a. Also, the receiving pad 20a includes an inductor 21a and a compensation capacitor 22a.

The compensation capacitor 17a is a capacitor which improves the power factor of the AC power provided to the transmission pad 10a. The power factor is the ratio between the active power and the apparent power. For efficient transmission of power, the reactive power can be set to a smaller value. Also, for efficient transmission of power, the power factor can be set to a value close to 1.

Since the transmission pad 10a including the inductor 18a is an inductive element, the phase of the current is delayed compared to the phase of voltage. Thus, reactive power occurs in the transmission pad 10a. However, by inserting a compensation capacitor 17a, the phase difference between the voltage and the current can be narrowed. By using the compensation capacitor 17a, the power factor can be improved. By improving the power factor, the efficiency of power transmission by the transmission pad 10a is improved.

In FIG. 3 and FIG. 4, a compensation capacitor 17a is connected to each side of the inductor 18a. Thus, the compensation capacitor 17a is connected to the inductor 18a in series.

The compensation capacitor 22a is a capacitor which improves the power factor of the AC power supplied from the transmission side to the receiving side. Generally, the load side of the compensation capacitor 22a tends to be inductive. Therefore, reactive power is generated. However, by inserting the compensation capacitor 22a, the phase difference between the current and the voltage can be narrowed. Therefore, the power factor can be set to a value close to 1, enabling efficient reception of power.

In FIG. 3, a compensation capacitor 22a is connected to both sides of the inductor 21a. Thus, the compensation capacitor 22a is connected to the inductor 21a in series. However, in FIG. 4, the compensation capacitor 22a is connected to the inductor 21a in parallel. Thus, the compensation capacitor can be connected to the inductor in series. Also, the compensation capacitor can be connected to the inductor in parallel. Thus, the compensation capacitor can be connected in any way. Also, the number of the compensation capacitor in the transmission side and the receiving side is not limited.

For transmission and reception of large electric powers, the compensation capacitor and the inductor can be connected to high-power cables. If the distance between the compensation capacitor and the inductor is long, a high-power cable with a long length needs to be used. Considering the weight of the high-power cable, the length of the cable can be shortened to reduce the weight of the non-contact power charging/supplying system. Also, if AC power flows in the high-power cable, the electromagnetic noise generated by the cable cannot be ignored. Electromagnetic interference can be reduced by making the length of the high-power cable shorter. Here, the high-power cable is example of the transmission line between the compensation capacitor and the inductor. Thus, other types of transmission lines can be used to transmit the electric power.

Thus, the compensation capacitor can be located in the neighboring regions of the inductor for transmission or reception of power. As described in FIG. 2 to FIG. 4, transmission/reception pads according to the embodiment each includes an inductor and a compensation capacitor. By using such configurations, the length of the transmission line corresponding to the aforementioned high-power cable can be minimized. Thereby, the weight of the non-contact power charging/supplying system can be reduced. Also, with shorter transmission lines, the electromagnetic interference can be reduced.

In above, the electric connection between the transmission pad 10a and the reception pad 20a was described. The electric connections of other pairs of the transmission/reception pads (for example, the transmission pad 10b and the reception pad 20b) are similar to above.

Next, the configuration of the transmitting side of the non-contact power charging/supplying system according to the first embodiment is described.

FIG. 5 is a diagram describing a configuration example of the transmitting side in the non-contact power charging/supplying system. The transmitting side of the non-contact power charging/supplying system includes an AC power source 11, an AC-DC converter 12, a DC-DC converter 13, an inverter 14a, an inverter 14b, a filter 15a, a filter 15b, a transmission pad 10a and a transmission pad 10b.

The transmission pad 10a includes a compensation capacitor 17a (compensation part) and an inductor 18a (inductor part) as internal components. Similarly, the transmission pad 10b includes a compensation capacitor 17b (compensation part) and an inductor 18b (inductor part) as internal components.

The AC power supply 11 provides AC power to the transmitting side of the non-contact power charging/supplying system. The AC power supply 11 can be electric power provided from electric companies. Also, the AC power supply 11 can be electric power provided from a power generator. The power generator can be an emergency power generator or a privately owned power generator. However, any type of AC power supply 11 can be used.

The AC-DC converter 12 converts AC power provided from the AC power supply 11 to DC power. The AC-DC converter 12 can be implemented by using transformers. Also, the AC-DC converter 12 can be implemented with switching elements. However, the configuration of the circuit used in the AC-DC converter 12 is not limited.

The DC-DC converter 13 converts the voltage of the DC power supplied from the AC-DC converter. The DC-DC converter 13 can be a step-up DC-DC converter. Also, the DC-DC converter 13 can be a step-down DC-DC converter. If conversion of voltage is not required, the DC-DC converter 13 can be omitted. Also, DC-DC converters can be connected to each of the inverters (inverter 14a and inverter 14b). Thereby, the current provided to the transmission pad 10a and the transmission pad 10b can be adjusted. The voltage of the DC power after conversion depends on the specification of the battery 27, transmission efficiency between the transmission pads and the reception pads.

The inverter 14a and the inverter 14b converts DC power to AC power with a specific frequency. For example, the inverter 14a and the inverter 14b can provide AC power with frequency lower than 200 kHz. Examples of the frequency include 9 kHz, 20 kHz and 85 kHz. However, the frequencies mentioned above are only examples. Therefore, the frequencies of the AC power provided by the inverter 14a and the inverter 14b are not limited. Also, the configuration of the circuits in the inverter 14a and the inverter 14b are not limited.

The filter 15a and the filter 15b are filters which reject the noise components in the AC power signals. Examples of the filter 15a and the filter 15b include low-pass filters or band-pass filters. The filter 15a and the filter 15b can reject noise components in high frequency ranges. Depending on the design, the filter 15a and the filter 15b can be omitted. Also, the number of filters can be increased. The location of the filters in the transmission side of the non-contact power charging/supplying system can be different from the configuration of FIG. 5.

The current provided to the inductor 18a of the transmission pad 10a and the current provided to the inductor 18b of the transmission pad 10b can be set to opposite phases by setting the polarity of AC voltage provided from the inverter 14a and the polarity of AC voltage provided from the inverter 14b to the opposite direction.

As mentioned above, the coils of the inductors 18a and 18b can be winded in the opposite direction ensuring that the direction of the magnetic field generated by the inductor 18a of the transmission pad 10a and the direction of the magnetic field generated by inductor 18b of the transmission pad 10b are opposite. Also, the polarity of connections of terminals for the inductor 18a and the polarity of connections of terminals for the inductor 18b can be the inversed. Then, the direction of current flowing in the coil of the inductor 18a and the direction of current flowing in the coil of the inductor 18b would be the opposite. In such configurations, the inverter 14a and the inverter 14b can be omitted.

The transmission pad 10a can be coupled to the reception pad 20a electromagnetically for transmitting electric power to the reception pad 20a. Such transmission of electric power is called a non-contact power charging/supplying method or a wireless power charging/supplying method. Examples of non-contact power charging/supplying methods include electromagnetic induction, magnetic resonance, electric field coupling and reception of wireless signals. However, any method can be used for non-contact power supply. Similarly, the transmission pad 10b can be coupled to the reception pad 20b electromagnetically for transmitting electric power to the reception pad 20b.

Next, the configuration of the receiving side of the non-contact power charging/supplying system according to the first embodiment is described.

Figure 6:
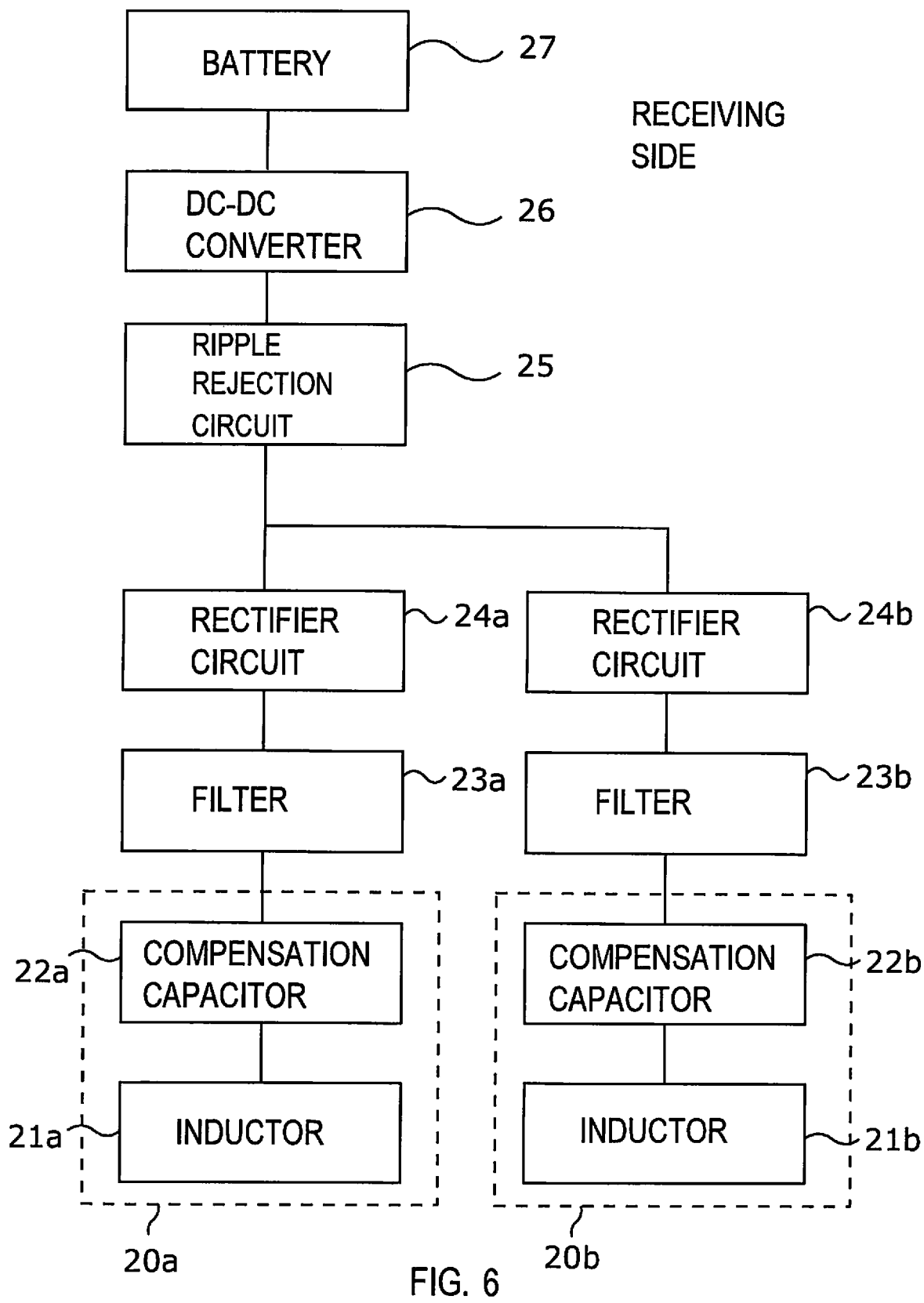
FIG. 6 is a diagram describing a configuration example of the receiving side in the non-contact power charging/supplying system.

FIG. 6 is a diagram describing a configuration example of the receiving side in the non-contact power charging/supplying system. The receiving side of the non-contact power charging/supplying system includes a reception pad 20a, a reception pad 20b, a filter 23a, a filter 23b, a rectifier circuit 24a, a rectifier circuit 24b, a ripple rejection circuit 25, a DC-DC converter 26 and a battery 27. The reception pad 20a has an inductor 21a and a compensation capacitor 22a as internal components. Similarly, the reception pad 20b has an inductor 21b and a compensation capacitor 22b as internal components.

The reception pad 20a can couple with the transmission pad 10a electromagnetically to receive electric power from the transmission pad 10a. Thus, the reception pad can receive electric power by non-contact power charging/supplying. Examples of non-contact power supply methods include electromagnetic induction, magnetic resonance, electric field coupling and reception of wireless signals. However, any method can be used for non-contact power supply.

The filter 23a and the filter 23b reject noise components from the AC power signal. Examples of the filter 23a and the filter 23b include a low-pass filter. By using the low-pass filter, high frequency noise components can be rejected. Also, depending on the design, the filter 23a and the filter 23b can be omitted. The locations of the filters can be different from the example described in FIG. 6.

Figure 7:
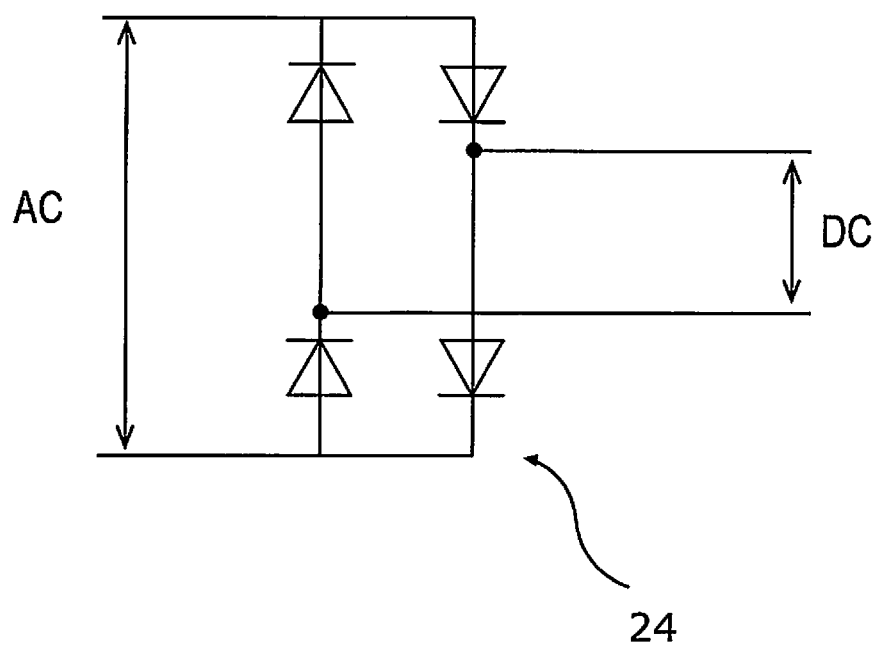
FIG. 7 is a diagram describing a configuration example of a rectifier circuit.

The rectifier circuit 24a and the rectifier circuit 24b rectify AC power, providing DC power as the outputs. One example of the rectifier circuit 24a and the rectifier circuit 24b is the full-bridge circuits which execute full wave rectification. Another example of the rectifier circuit 24a and the rectifier circuit 24b is the half-bridge circuits which execute half wave rectification. By using a full-bridge circuit or a half-bridge circuit, backflow of currents from the battery 27 to the direction of the reception pad 20a and the reception pad 20b can be prevented. FIG. 7 is a diagram describing a configuration example of a rectifier circuit. In FIG. 7, the rectifier circuit 24 includes diodes.

The ripple rejection circuit 25 rejects ripples (pulsating currents) included in the DC signal which is rectified in the previous stage. Examples of the ripple rejection circuit 25 include LC low-pass filters and circuits with smoothing capacitors. However, the configuration of circuit is not limited. In FIG. 6, after the power signal provided from the rectifier circuit 24a and the power signal provided from the rectifier circuit 24b are combined, the power signal is entered to the ripple rejection circuit 25. However, the ripple rejection circuit 25 can be connected to each of the circuit branches, before the power signal provided from the rectifier circuit 24a and the power signal provided from the rectifier circuit 24b are combined. In this case, two ripple rejection circuits 25 are required. Also, third ripple rejection circuit can be connected after the power signals are combined. Depending on the designs, the ripple rejection circuit 25 can be omitted.

The DC-DC converter 26 converts the voltage of the DC power supplied from the ripple rejection circuit 25. The DC-DC converter 26 can be a step-up DC-DC converter. Also, the DC-DC converter 26 can be a step-down DC-DC converter. If conversion of voltage is not required, the DC-DC converter 26 can be omitted. A plurality of DC-DC converters can be connected in parallel to adjust the ratio of the AC current flowing in the reception pad 20a and the reception pad 20b. The voltage of DC power provided by the DC-DC converter 26 depends on factors including the specification of the battery 27.

The battery 27 is a secondary battery which can be charged with DC power. Examples of secondary batteries include lithium-ion batteries and lead-acid batteries. However, the type of secondary battery is not limited. The capacity, the rated voltage and the standard of the battery 27 can be determined based on the device which operates by the stored electricity, driving voltage and the consumption of electric power. Also, the battery 27 may include a fuel-gauge IC. Processes such as the charging, discharging and adjustment of currents can be executed by the fuel-gauge IC. Also, the above processes can be executed by an external device.

Figure 8:
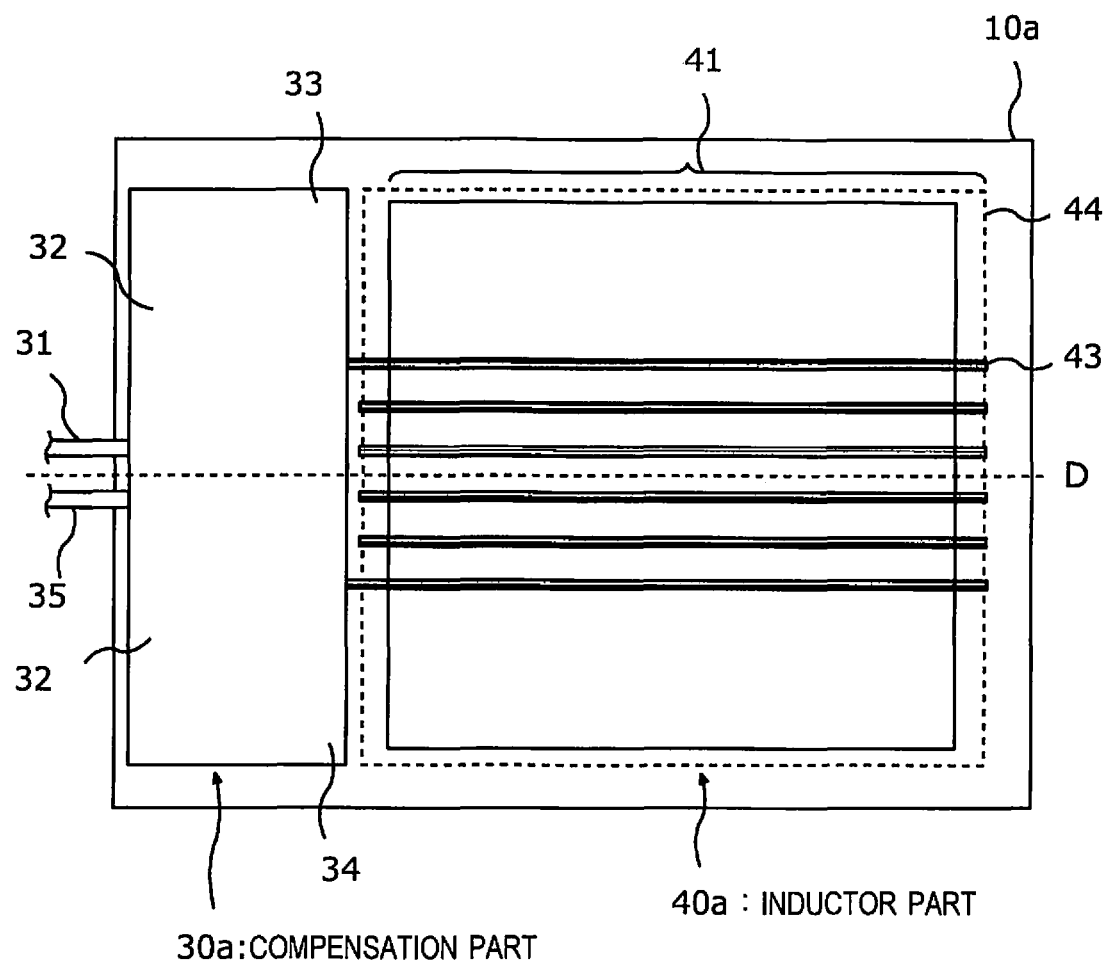
FIG. 8 is a plan view diagram describing a detailed configuration example of the transmission/reception pad.
Figure 9:
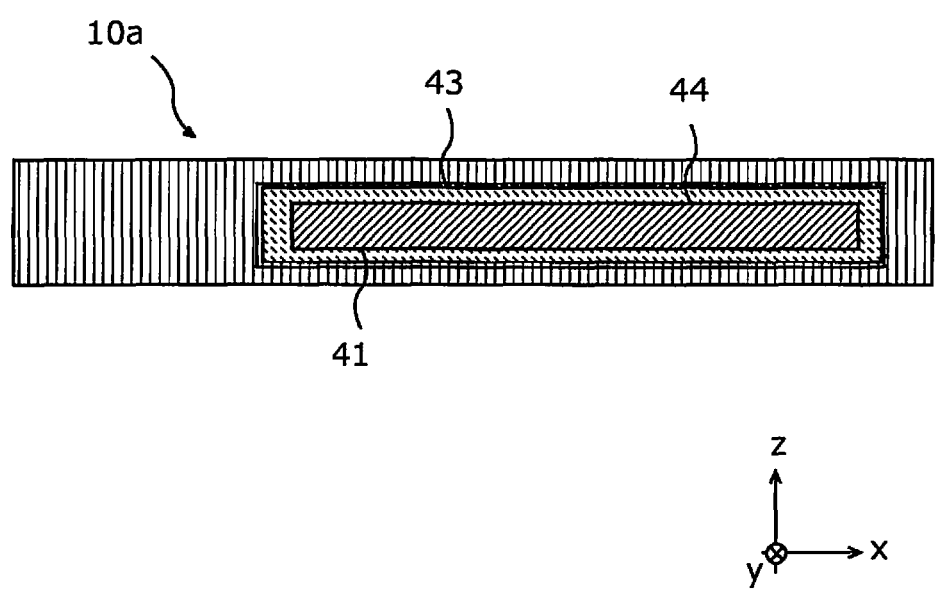
FIG. 9 is a cross-sectional diagram describing a detailed configuration example of the transmission/reception pad.

FIG. 8 is a plan view diagram describing a detailed configuration example of the transmission/reception pad. FIG. 9 is a cross-sectional diagram describing the cross-section of the transmission pad 10*a* in FIG. 8 in the z-x plane including the line D. In the following, the detailed configuration of the transmission/reception pad is described with references to FIG. 8 and FIG. 9.

The transmission pad 10*a* of FIG. 8 is an approximately plate-shaped object. The transmission pad 10*a* includes a compensation part 30*a* and an inductor part 40*a*. The compensation part 30*a* is connected electrically to the circuit in the AC power supply side via the input terminal 31 and the output terminal 35. The inductor part 40 includes a core 41, a coil 43 and a frame 44.

First, components in the compensation part 30*a* are described.

The input terminal 31 and the output terminal 35 are connected electrically to the AC power supply 11 of the non-contact power charging/supplying system. The input terminal 31 and the output terminal 35 can be formed with conductive materials such as metals. Also, the compensation part 30*a* is connected electrically to the coil 43 (inductor) in the inductor part 40.

A compensation capacitor is connected between the input terminal 31 and the coil 43 (inductor). Also, a compensation capacitor is connected between the coil 43 (inductor) and the output terminal 35. The compensation capacitor can be a combination of a plurality of capacitors with series-parallel connections. Thereby, without the use of large film capacitors or multilayer ceramic chip capacitors, compensation capacitors with large rated voltages and large rated currents can be implemented. Also, the combination of a plurality of capacitors can be configured so that there is some redundancy in the capacitors. Thereby, the durability of the compensation capacitor can be improved.

The configuration of FIG. 8 and FIG. 9 is only an example. Therefore, a configuration which is different from the example described above can be used. For example, the compensation capacitor can be formed by using a large film capacitor or a multilayer ceramic chip capacitor. If the compensation capacitor is formed by using a plurality of capacitors, the number of capacitors is not limited. Also, the connection between the capacitors is not limited.

Next, components included in the inductor part 40 are described.

The core 41 is the first core of the transmission pad 10*a* (first transmission pad). The core 41 can be formed with magnetic materials. Examples of magnetic materials include ferrite and electrical steel sheets. However, the type of material used to form the core 41 is not limited.

The location of the core 41 is supported by the frame 44. The frame 44 is configured so that the location of core 41 can be fixed. The core 41 can be completely stored in the frame 44. Also, part of the core 41 can be exposed to the exterior of the frame 44. Examples of materials used to form the frame 44 include insulators such as ceramic and resin. However, the material used to form the frame 44 is not limited.

The spaces between the frame 44 and the core 41 can be filled with filling materials. Examples of filling materials include insulators such as resin. By filling the spaces, it becomes easier to emit the heat generated in the core 41 to the external environment. Also, by combining the frame 44 and filling material, it is possible to protect the core 41 from thermal stress during the manufacturing process of the transmission/reception pads. Also, the core 41 can be protected from external shocks. However, the inductor part 40 does not necessary need to have a frame 44 and filling materials.

The coil 43 is winded along the outer circumference of the frame 44 which stores the core 41. As described in FIG. 9, the coil 43 is winded around the core 41 (first core). The coil 43 can be formed with metals such as copper wires, aluminum wires, litz wires and bus bars. As long as conductive material is used, any type of material can be used to form the coil 43. The surface of the wiring or conductors forming the coil 43 can be covered with insulators such as enamel.

The core of the inductor part in FIG. 8 is a continuous object. However, this configuration is only an example. Thus, the core does not necessary have to be a continuous object. For example, a core which is a combination of plurality of parts can be used.

Figure 10:
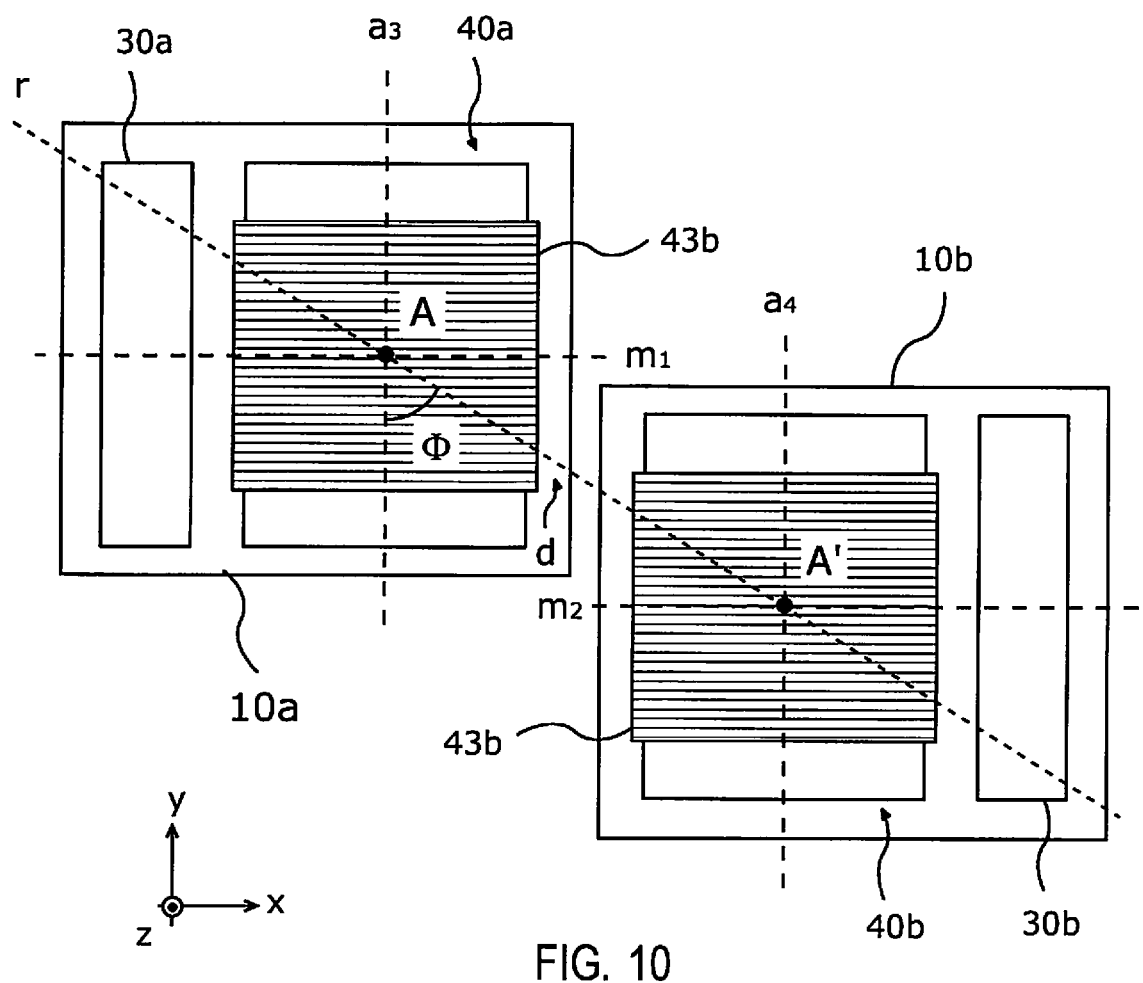
FIG. 10 is a plan view diagram describing a first example of the location of compensation capacitor in the transmission/reception pad.

In the following, the configuration of an inductor device which reduces the intensity of the generated magnetic field is described. FIG. 10 is a plan view diagram describing a first example of the location of compensation capacitor in the transmission/reception pad. The plan view diagram of FIG. 10 describes the location of the compensation part 30*a* and the inductor part 40*a* in the transmission pad 10*a*. Also, the plan view diagram of FIG. 10 describes the location of the compensation part 30*b* and the inductor part 40*b* in the transmission pad 10*b*. The compensation part 30*a* and 30*b* each include a compensation capacitor. The inductor part 40*a* includes a core (first core) and a coil 43*a*. The inductor part 40*b* includes a core (second core) and a coil 43*b*. Since FIG. 10 is illustrated to describe the location of the components, parts of the detailed configuration in transmission pad 10*a* and 10*b* are not shown.

In the following, the configuration of the inductor device 10 in the transmitting side is described. However, if the transmission pad is replaced with the reception pad, the explanation on the location and configuration of the inductor part (coil) and the compensation part (compensation capacitor) can be applied to the inductor device 20 in the receiving side as well.

The first transmission/reception pad included in the inductor device is called the first pad. The second transmission/reception pad included in the inductor device is called the second pad. Also, the inductor part included in the first pad is called the first inductor part. The inductor part included in the second pad is called the second inductor part. Also, the region where the compensation capacitor is located in the first pad is called the first compensation part. The region where the compensation capacitor is located in the second pad is called the second compensation part.

In the following description, the direction of the magnetic field (magnetic flux) in the magnetic core generated when current is flowing in the coil 43 is called the length direction of the inductor part. In the example of FIG. 10, the length direction of the inductor part is the y-axis direction. Also, the direction which is perpendicular to the length direction of the inductor part (direction of magnetic flux in the magnetic core) is called the width direction of the inductor part. Also, in the example of FIG. 10, the z-axis direction is called the thickness direction of the inductor part.

Similarly, the direction of the magnetic flux generated by the coil is called the length direction of the coil. In the example of FIG. 10, the length direction of the coil is the y-axis direction. The direction the coil is winded in the x-y plane is called the width direction of the coil. In the example of FIG. 10, the width direction of the coil is the x-axis direction.

The broken line $a_3$ (first line) is the central line of the coil $43a$ (first coil) in the inductor part $40a$ (first inductor part) of the transmission pad $10a$ (first pad). The broken line $a_3$ (first line) is in the same direction as the first magnetic flux generated by the coil $43a$ (first coil) of the inductor part $40a$ (first inductor part). Similarly, the broken line $a_4$ (third line) is the central line of the coil $43b$ (second coil) in the inductor part $40b$ (second inductor part) of the transmission pad $10b$ (second pad). The broken line $a_4$ (third line) is in the same direction as the first magnetic flux generated by the coil $43b$ (second coil) of the inductor part $40b$ (second inductor part).

The broken line $m_1$ (second line) is the central line of the length direction of the coil $43a$ (first coil) in the inductor part $40a$ (first inductor part) of the transmission pad $10a$ (first pad). The broken line $m_1$ (second line) is perpendicular to the direction of the first magnetic flux. Also, the broken line $m_2$ (fourth line) is the central line of the length direction of the coil $43b$ (second coil) in the inductor part $40b$ (second inductor part) of the transmission pad $10b$ (second pad). The broken line $m_2$ (fourth line) is perpendicular to the direction of the second magnetic flux.

In the example of FIG. 10, the direction the coil is winded is approximately parallel to the broken lines $m_1$ and $m_2$, in the x-y plain. However, the direction the coil is winded does not have to be approximately parallel to the broken lines $m_1$ and $m_2$.

In the example of FIG. 10, the inductor part $40a$ and $40b$ are located to ensure that the directions of the generated magnetic fluxes are approximately parallel. Therefore, the broken line $a_3$ (first line) and the broken line $a_4$ (third line) are approximately parallel. However, the broken line $a_3$ (first line) and the broken line $a_4$ (third line) do not necessary have to be approximately parallel. Also, the broken line $m_1$ (second line) and the broken line $m_2$ (fourth line) do not necessary have to be approximately parallel. The sizes of the inductor part $40a$ and the inductor part $40b$ (the first inductor and the second inductor) in the length direction and the width direction are not limited.

The intersection of the broken line $a_3$ (first line) and the broken line $m_1$ (second line) in the inductor part $40a$ (first inductor part) is called the point A (first point). Also, the intersection of the broken line $a_4$ (third line) and the broken line $m_2$ (fourth line) in the inductor part $40b$ (second inductor part) is called the point A' (second point). The broken line r (fifth line) is a line which connects the point A (first point) and the point A' (second point). The distance between the point A and the point A' on the broken line r is d. The angle (first angle) between the broken line $a_3$ (first line) and the broken line r (fifth line) is $\Phi$. Depending on the angle $\Phi$, the coupling coefficients of the inductors in the same side (transmission side or receiving side) change. The size of the angle $\Phi$ is not limited. However, the angle $\Phi$ can be adjusted to ensure that the coupling coefficients between the inductors in the same side are minimized, for the sake of efficient transmission of electric power.

As described in FIG. 1 and FIG. 2, the inductor devices can include a plurality of transmission/reception pads for supplying large electric powers. In the example of FIG. 2, the transmission pads are located to ensure that the line $a_1$ and the line $a_2$ are approximately parallel. Thereby, magnetic fields with opposite directions were generated in the inductor device of the transmitting side, reducing the intensity of leakage magnetic field. In the example of FIG. 10, the broken line $a_3$ (first line) and the broken line $a_4$ (third line) were approximately parallel. Therefore, similar effects can be expected for the example of FIG. 10 as well.

In the following, a method for reducing the intensity of the leakage magnetic field by optimizing the locations of the inductor parts is described.

Figure 11:
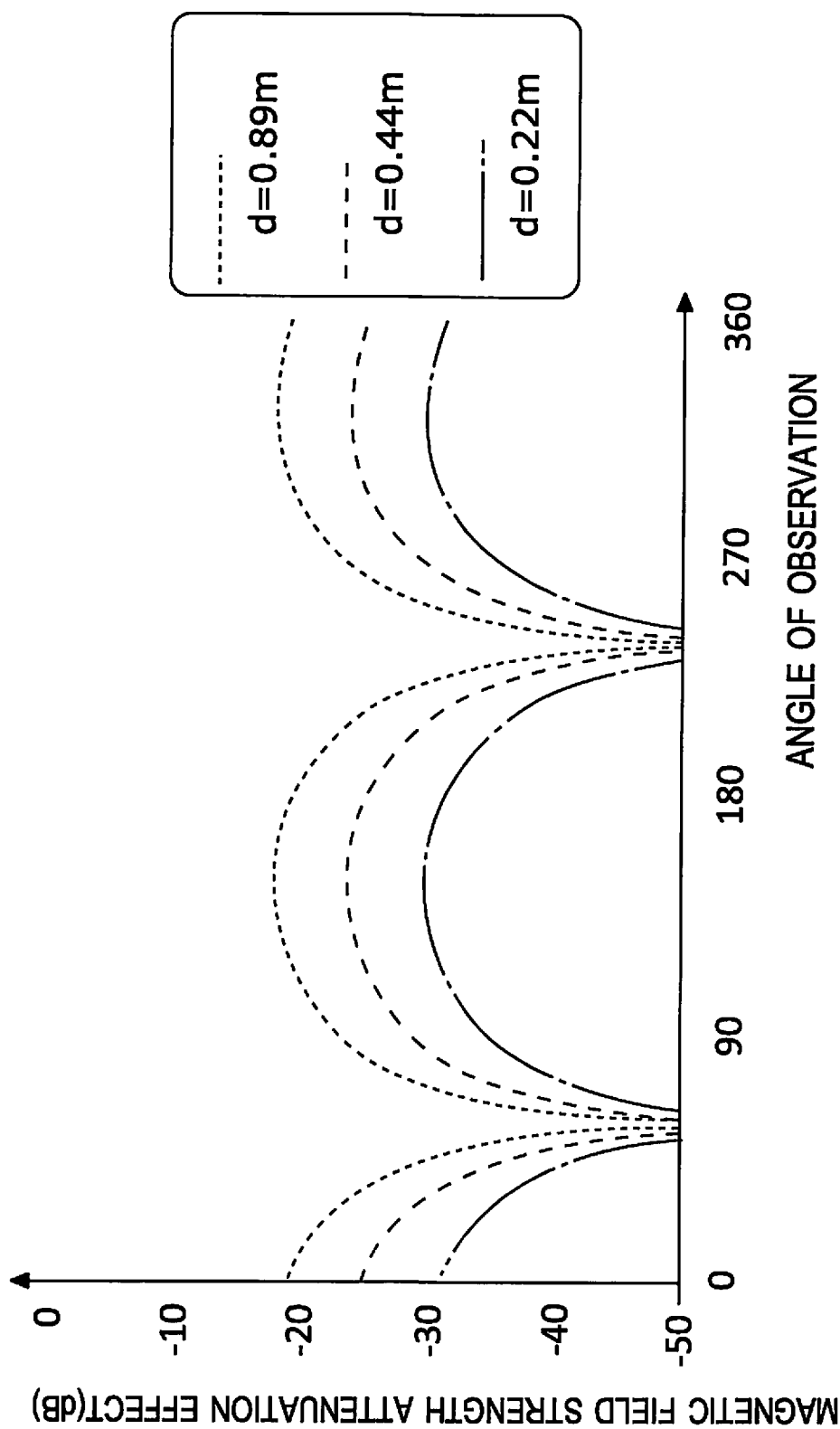
FIG. 11 is a graph showing relationship between distance between inductor parts and magnetic field strength attenuation effect.

FIG. 11 is a graph which presents the theoretical value of magnetic field strength attenuation effect when the transmission pads are located according to the configuration of FIG. 10. Also, the current provided to the inductor parts of each transmission pad have opposite phases in the example of FIG. 11. The graph of FIG. 11 represents the theoretical values of the magnetic field strength attenuation effect measured at a point which is ten meters away from the inductor device. The horizontal axis of FIG. 11 represents the angle of observation. The vertical axis of FIG. 11 represents the magnetic field strength attenuation effect in decibels. In FIG. 11, the magnetic field strength attenuation effect for three cases: d=0.89 m; d=0.44 m; and d=0.22 m are presented. Referring to FIG. 11, if the distance d between the inductor parts are shorter, the magnetic field strength attenuation effect becomes stronger. This is because the difference in the intensity of magnetic fields generated by each inductor part in the inductor device tends to become smaller if the distance d between the inductor parts becomes shorter.

By referring to FIG. 11, the distance between the coil $43a$ and the coil $43b$ can be shortened in order to enhance the magnetic field strength attenuation effect. Here, the coil $43a$ is in the inductor part $40a$ (first inductor part) of the transmission/reception pad $10a$ (first pad). The coil $43b$ is in the inductor part $40b$ (second inductor part) of the transmission/reception pad $10b$ (second pad).

As mentioned in the description of FIG. 3, if the compensation capacitor (compensation part) is placed in the transmission/reception pad, it is possible to reduce the electromagnetic noise. Also, the weight of the non-contact power charging/supplying system can be reduced. However, the compensation capacitor (compensation part) occupies a certain region in the transmission/reception pad. If components which occupy a certain region exist in the inductor device, it may become difficult to make the distance between the first inductor part and the second inductor part shorter.

Therefore, the allocation of components which occupy a certain region can be avoided for the region between the inductor part $40a$ (first inductor part of the first pad) and the inductor part $40b$ (second inductor part of the second pad which is next to the first pad), as presented in the example of FIG. 10. By avoiding the allocation of components which occupy a certain region in the region between the neighboring transmission/reception pads, the distance between the first inductor part and the second inductor part can be shortened.

The inductor device 10 with the configuration of FIG. 10 includes a transmission pad $10a$ (first pad) and a transmission pad $10b$ (second pad). In the transmission pad $10a$ (first pad), a compensation part $30a$ (first compensation part) including a compensation capacitor is located in the x-axis negative direction (first direction) side. Also, an inductor part $40a$ (first inductor part) is located in the x-axis positive direction (second direction which is the opposite of the first direction) side. The inductor part $40a$ (first inductor part) includes a first core and a coil $43a$ (first coil) winded around the first core.

In the transmission pad $10b$ (second pad), an inductor part $40b$ (second inductor part) is located in the x-axis negative direction (first direction) side. The inductor part $40b$ includes a second core and a coil $43b$ (second coil) winded around the second core. Also, a compensation part 30*b* (second compensation part) including a compensation capacitor is located in the x-axis positive direction (second direction) side. The coil 43*a* (first coil) can be winded in either the x-axis negative direction (first direction) or the x-axis positive direction (second direction). The coil 43*b* (second coil) can be winded in either the x-axis negative direction (first direction) or the x-axis positive direction (second direction).

The transmission pad 10*a* (first pad) and the transmission pad 10*b* (second pad) can be located in approximately the same plane (plane x-y). This plane is approximately parallel to the first direction (x-axis negative direction) and the second direction (x-axis positive direction). Also, the transmission pad 10*b* (second pad) is located in the second direction (x-axis positive direction) side of the transmission pad 10*a* (first pad). The aforementioned locations of the transmission pad 10*a* (first pad) and the transmission pad 10*b* (second pad) are only examples. For example, the transmission pad 10*a* (first pad) and the transmission pad 10*b* (second pad) can be located in different planes while the transmission pad 10*a* (first pad) and the transmission pad 10*b* (second pad) are approximately parallel.

If the inductor pad 10*a* is replaced with the reception pad 20*a* (both are first pads) and the inductor pad 10*b* is replaced with the reception pad 20*b* (both are second pads) in the configuration of FIG. 10, it becomes equal to the configuration of inductor device 20 in the receiving side. Inductor device 20 is coupled with the inductor device 10 in the transmitting side when transmission of electrical power is executed.

The first pad (transmission pad 10*a* or the reception pad 20*a*) in FIG. 10 and the second pad (transmission pad 10*b* or the reception pad 20*b*) are plan view rectangular shaped objects which are approximately plate-shaped. However, the above shape is only an example. Therefore, a first pad and a second pad with different shapes can be used. For example, first pads and second pads which are approximately plan view parallelogram shaped, approximately plan view trapezoidal shaped, approximately plan view hexagonal shaped, approximately plan view ellipse shaped or approximately plan view circle shaped can be used. Also, the shapes of the first pad and the second pad can be different.

Figure 12:
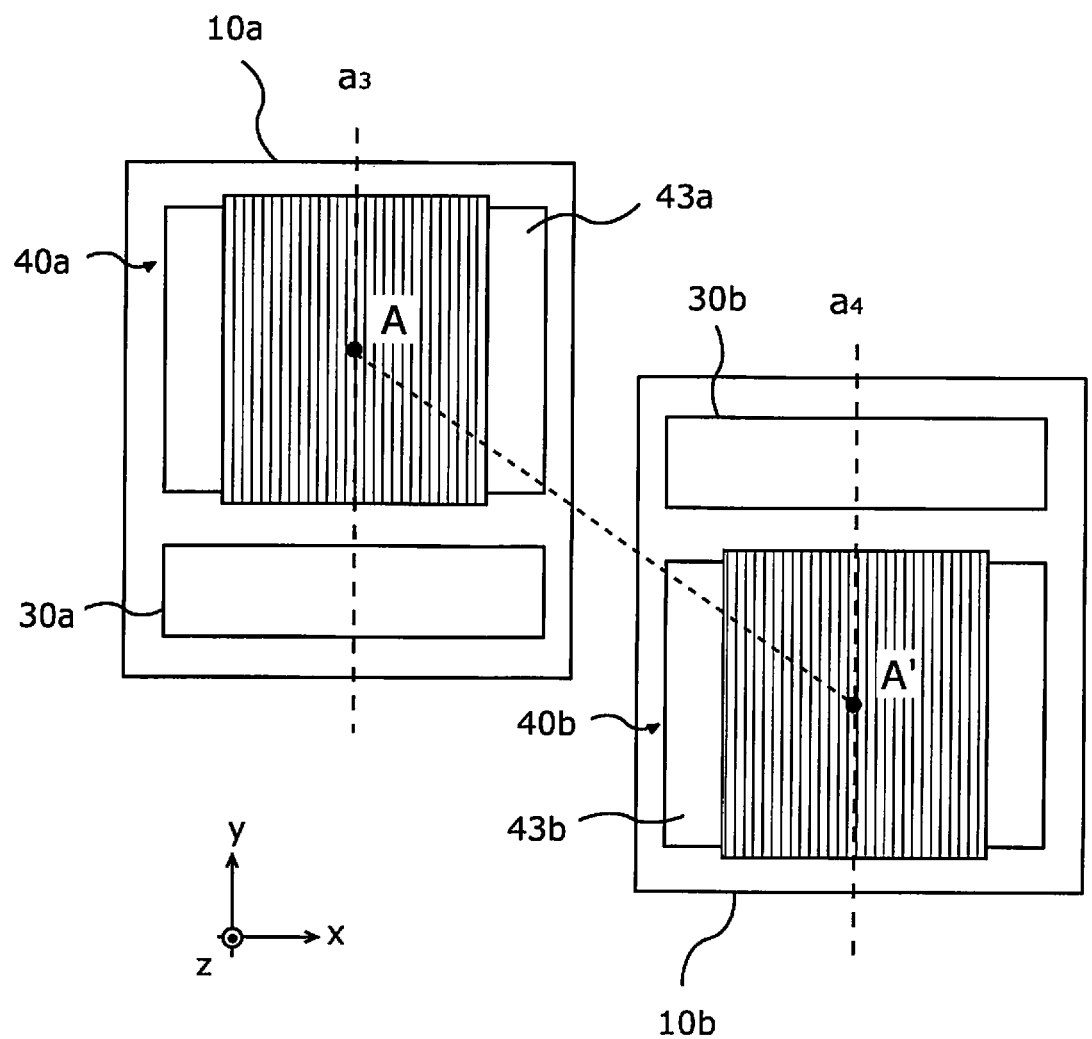
FIG. 12 is a plan view diagram describing a second example of the location of compensation capacitor in the transmission/reception pad.

In the following, another example of the configuration of the transmission/reception pads in the inductor device is described. FIG. 12 is a plan view diagram describing a second example of the location of compensation capacitor in the transmission/reception pad.

The inductor device 10 with the configuration of FIG. 12 includes a transmission pad 10*a* (first pad) and a transmission pad 10*b* (second pad). In the transmission pad 10*a* (first pad), a compensation part 30*a* (first compensation part) including a compensation capacitor is located in the y-axis negative direction (first direction) side. Also, an inductor part 40*a* (first inductor part) is located in the y-axis positive direction (second direction which is opposite of the first direction) side. The inductor part 40*a* (first inductor part) includes a first core and a coil 43*a* (first coil) winded around the first core.

In the transmission pad 10*b* (second pad), an inductor part 40*b* (second inductor part) is located in the y-axis negative direction (first direction) side. The inductor part 40*b* includes a second core and a coil 43*b* (second coil) winded around the second core. Also, a compensation part 30*b* (second compensation part) including a compensation capacitor is located in the y-axis positive direction (second direction) side. The coil 43*a* (first coil) can be winded in either the y-axis negative direction (first direction) or the y-axis positive direction (second direction). The coil 43*b* (second coil) can be winded in either the y-axis negative direction (first direction) or the y-axis positive direction (second direction).

The transmission pad 10*a* (first pad) and the transmission pad 10*b* (second pad) can be located in approximately the same plane (plane x-y). This plane is approximately parallel to the first direction (y-axis negative direction) and the second direction (y-axis positive direction). The transmission pad 10*a* (first pad) is located in the x-axis negative direction (third direction) side. Here, the third direction is perpendicular to both the first direction and the second direction. Also, the transmission pad 10*b* (second pad) is located in the x-axis positive direction (fourth direction) side. The fourth direction is the opposite direction of the third direction.

The aforementioned locations of the transmission pad 10*a* (first pad) and the transmission pad 10*b* (second pad) are only examples. For example, the transmission pad 10*a* (first pad) and the transmission pad 10*b* (second pad) can be located in different planes while the transmission pad 10*a* (first pad) and the transmission pad 10*b* (second pad) are approximately parallel.

By using the configuration of FIG. 12, the distance between the first inductor part of the first pad and the second inductor part of the second pad can be shortened, reducing the intensity of leakage magnetic fields. If the inductor pad 10*a* is replaced with the reception pad 20*a* (both are first pads) and the inductor pad 10*b* is replaced with the reception pad 20*b* (both are second pads) in the configuration of FIG. 12, it becomes equal to the configuration of inductor device 20 in the receiving side. Inductor device 20 is coupled to the inductor device 10 in the transmitting side when transmission of electrical power is executed.

Figure 13:
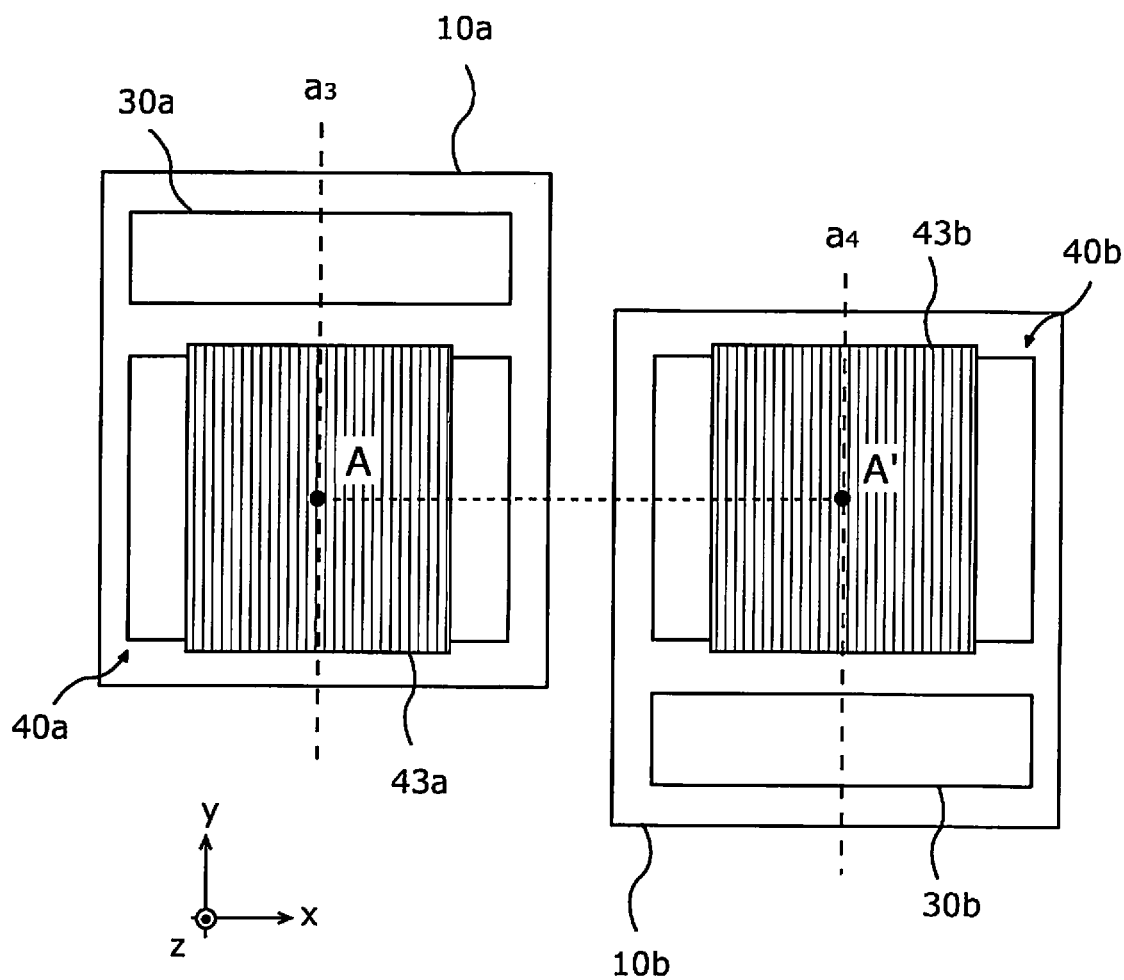
FIG. 13 is a plan view diagram describing a third example of the location of compensation capacitor in the transmission/reception pad.

FIG. 13 is a plan view diagram describing a third example of the location of compensation capacitor in the transmission/reception pad.

The inductor device 10 with the configuration of FIG. 13 includes a transmission pad 10*a* (first pad) and a transmission pad 10*b* (second pad). In the transmission pad 10*a* (first pad), a compensation part 30*a* (first compensation part) including a compensation capacitor is located in the y-axis positive direction (first direction) side. Also, an inductor part 40*a* (first inductor part) is located in the y-axis negative direction (second direction which is opposite of the first direction) side. The inductor part 40*a* (first inductor part) includes a first core and a coil 43*a* (first coil) winded around the first core.

In the transmission pad 10*b* (second pad), an inductor part 40*b* (second inductor part) is located in the y-axis positive direction (first direction) side. The inductor part 40*b* includes a second core and a coil 43*b* (second coil) winded around the second core. Also, a compensation part 30*b* (second compensation part) including a compensation capacitor is located in the y-axis negative direction (second direction) side. The coil 43*a* (first coil) can be winded in either the y-axis positive direction (first direction) or the y-axis negative direction (second direction). The coil 43*b* (second coil) can be winded in either the y-axis positive direction (first direction) or the y-axis negative direction (second direction).

The transmission pad 10*a* (first pad) and the transmission pad 10*b* (second pad) can be located in approximately the same plane (plane x-y). This plane is approximately parallel to the first direction (y-axis positive direction) and the second direction (y-axis negative direction). The transmission pad 10a (first pad) is located in the x-axis negative direction (third direction) side. Here, the third direction is perpendicular to both the first direction and the second direction. Also, the transmission pad 10b (second pad) is located in the x-axis positive direction (fourth direction) side. The fourth direction is the opposite direction of the third direction.

The aforementioned locations of the transmission pad 10a (first pad) and the transmission pad 10b (second pad) are only examples. For example, the transmission pad 10a (first pad) and the transmission pad 10b (second pad) can be located in different planes while the later and the former are approximately parallel.

By using the configuration of FIG. 13, the distance between the first inductor part of the first pad and the second inductor part of the second pad can be shortened, reducing the intensity of leakage magnetic fields. If the inductor pad 10a is replaced with the reception pad 20a (both are first pads) and the inductor pad 10b is replaced with the reception pad 20b (both are second pads) in the configuration of FIG. 13, it becomes equal to the configuration of inductor device 20 in the receiving side. Inductor device 20 is coupled to the inductor device 10 in the transmitting side when transmission of electrical power is executed.

Second Embodiment

The non-contact power charging/supplying system according to the first embodiment had a pair of inductor devices each with two transmission/reception pads. However, the inductor device can have a different number of transmission/reception pads. In the non-contact power charging/supplying system according to the second embodiment, each of the inductor devices has four transmission/reception pads. By increasing the number of transmission/reception pads located in the inductor device, the transmitted electric power can be increased.

Figure 14:
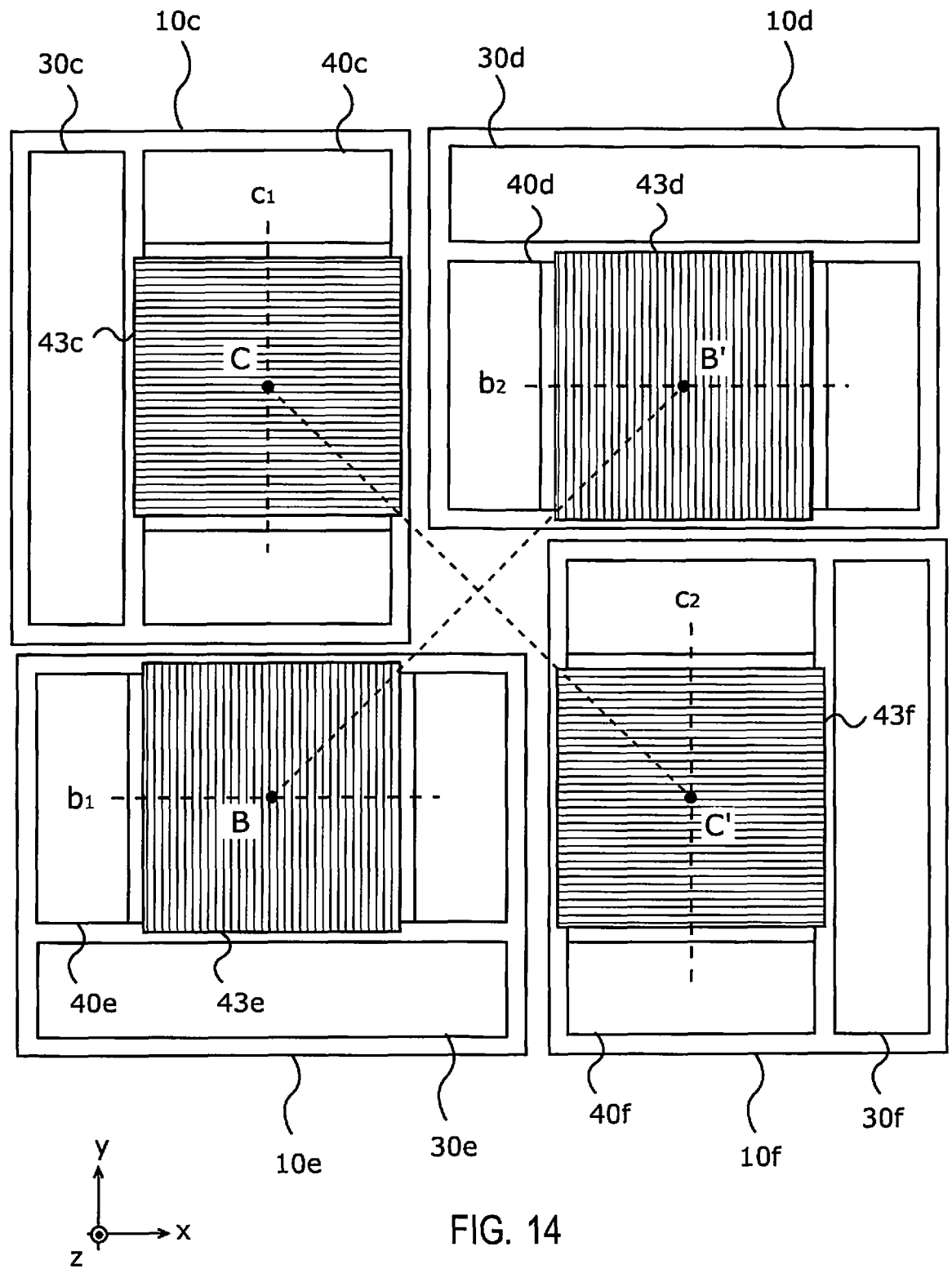
FIG. 14 is a plan view diagram describing a fourth example of the location of compensation capacitor in the transmission/reception pad.

FIG. 14 is a plan view diagram describing a fourth example of the location of compensation capacitor in the transmission/reception pad. In the following, the configuration of the inductor device according to the second embodiment is described with reference to FIG. 14.

The inductor device 10 with the configuration of FIG. 14 includes a transmission pad 10c (first pad), a transmission pad 10f (second pad), a transmission pad 10e (third pad) and a transmission pad 10d (fourth pad). The transmission pad 10c (first pad), the transmission pad 10f (second pad), the transmission pad 10e (third pad) and the transmission pad 10d (fourth pad) are all located in approximately the same plane (plane x-y). Here, the plane x-y is called the first plane.

The transmission pad 10c (first pad), the transmission pad 10f (second pad), the transmission pad 10e (third pad) and the transmission pad 10d (fourth pad) can be located in different planes while each of the transmission pads are approximately parallel. In this case, plane which is approximately parallel to the first plane is called the second plane.

In the transmission pad 10c (first pad), a compensation part 30c (first compensation part) including a compensation capacitor is located in the x-axis negative direction (first direction) side. Also, an inductor part 40c (first inductor part) is located in the x-axis positive direction (second direction which is opposite of the first direction) side. The inductor part 40c (first inductor part) includes a first core and a coil 43c (first coil) winded around the first core. Here, both the first direction and the second direction are approximately parallel to the aforementioned first plane (x-y plane). The coil 43c (first coil) is winded in either the x-axis negative direction (first direction) or the x-axis positive direction (second direction).

In the transmission pad 10f (second pad), an inductor part 40f (second inductor part) is located in the x-axis negative direction (first direction) side. The inductor part 40f (second inductor part) includes a second core and a coil 43f (second coil) winded around the second core. Also, a compensation part 30f (second compensation part) including a compensation capacitor is located in the x-axis positive direction (second direction) side. The coil 43f (second coil) can be winded in either the x-axis negative direction (first direction) or the x-axis positive direction (second direction). The transmission pad 10f (second pad) is located in the x-axis positive direction (second direction) side of the transmission pad 10c (first pad).

In the transmission pad 10e (third pad), a compensation part 30e (third compensation part) including a compensation capacitor is located in the y-axis negative direction (third direction) side. Here, the third direction is perpendicular to both the first direction and the second direction. Also, the third direction is approximately parallel to the aforementioned first plane. Also, an inductor part 40e (third inductor part) is located in the y-axis positive direction (fourth direction which is opposite of the third direction) side. The inductor part 40e (third inductor part) includes a third core and a coil 43e (third coil) winded around the third core. The coil 43e (third coil) can be winded in either the y-axis negative direction (third direction) or the y-axis positive direction (fourth direction).

In the transmission pad 10d (fourth pad), an inductor part 40d (fourth inductor part) is located in the y-axis negative direction (third direction) side. The inductor part 40d (fourth inductor part) includes a fourth core and a coil 43d (fourth coil) winded around the fourth core. Also, a compensation part 30d (fourth compensation part) including a compensation capacitor is located in the y-axis positive direction (fourth direction) side. The coil 43d (fourth coil) can be winded in either the y-axis negative direction (third direction) or the y-axis positive direction (fourth direction).

The transmission pad 10e (third pad) is located in the first location. Here, the first location is a location on the first plane (plane x-y) which is located in the y-axis negative direction (third direction) side of the transmission pad 10c (first pad) and the x-axis negative direction (first direction) side of the transmission pad 10f (second pad).

The transmission pad 10d (fourth pad) is located in the second location. Here, the second location is a location on the first plane (plane x-y) which is located in the y-axis positive direction (fourth direction) side of the transmission pad 10f (second pad) and the x-axis positive direction (second direction) side of the transmission pad 10d (fourth pad).

The broken line $c_1$ in FIG. 14 is in the direction of the first magnetic flux generated by the coil 43c (first coil) of the inductor part 40c (first inductor part). Also, the broken line $c_1$ is the central line of the coil 43c (first coil) in the width direction. The broken line $c_2$ is in the direction of the second magnetic flux generated by the coil 43f (second coil) of the inductor part 40f (second inductor part). Also, the broken line $c_2$ is the central line of the coil 43f (second coil) in the width direction.

The broken line $b_1$ in FIG. 14 is in the direction of the third magnetic flux generated by the coil 43e (third coil) of the inductor part 40e (third inductor part). Also, the broken line $b_1$ is the central line of the coil 43e (third coil) in the width direction. The broken line $b_2$ is in the direction of the fourth magnetic flux generated by the coil 43d (fourth coil) of the inductor part 40d (fourth inductor part). Also, the broken line $b_2$ is the central line of the coil 43d (fourth coil) in the width direction.

If a plurality of transmission pads is included in the inductor device of the transmitting side, there is a risk that the intensity of leakage magnetic fields increases in the surrounding environment. Therefore, pairs of inductor parts (coils) with currents with the phase difference of π radians (inverse phases) can be formed. Therefore, the leakage magnetic field (leakage magnetic flux) generated by the inductor parts (coils) belonging to the same pair can cancel out with each other. In order to reduce the intensity of the leakage magnetic flux, the following configuration can be used.

For example, in the configuration of FIG. 14, the coil 43c (first coil) of the inductor part 40c (first inductor part) and the coil 43f (second coil) of the inductor part 40f (second inductor part) can be located to ensure that the broken line $c_1$ and the broken line $c_2$ are approximately parallel. The current provided to the coil 43c (first coil) and the current provided to the coil 43f (second coil) can have opposite phases. Also, instead of using currents of opposite phases, the direction that the coil 43c (first coil) is winded and the direction that the coil 43f (second coil) is winded can be opposite directions.

Similarly, in the configuration of FIG. 14, the coil 43e (third coil) of the inductor part 40e (third inductor part) and the coil 43d (fourth coil) of the inductor part 40d (fourth inductor part) can be located to ensure that the broken line $b_1$ and the broken line $b_2$ are approximately parallel. The current provided to the coil 43e (third coil) and the current provided to the coil 43d (fourth coil) can have opposite phases. Also, instead of providing currents of opposite phases to the coils, the direction that the coil 43e (third coil) is winded and the direction that the coil 43d (fourth coil) is winded can be opposite directions.

If the phase of the current provided to the coil 43c (first coil) is set to $\phi_1=\theta$, the phase of the current provided to the coil 43d (fourth coil) can be set to $\phi_4=\theta+\pi/2$. The phase of the current provided to the coil 43f (second coil) can be set to $\phi_2=\theta+\pi$. Also, the phase of the current provided to coil 43e (third coil) can be set to $\phi_3=\theta+3\pi/2$. The above phases of the currents provided to the coils are only examples. Therefore, phases different from the example above can be used for the currents provided to each of the coils.

Also, the frequency of the AC power signal provided to the coil 43c (first coil) and the coil 43d (fourth coil) can be set to $f_1$. The frequency of the AC power signal provided to the coil 43f (second coil) and the coil 43e (third coil) can be set to $f_2$. Thus, depending on the pair of coils, different frequencies can be used for the AC power signal. Thus, it is possible to prevent the magnetic noise to concentrate in a certain frequency, reducing the intensity of the leakage magnetic field in each of the frequencies.

In the configuration of FIG. 14, the distance between the inductor parts belonging to the same pair can be narrowed. Thus, the distance between the first inductor part and the second inductor part can be narrowed. Also, the distance between the third inductor part and the fourth inductor part can be narrowed. Then, the attenuation effect of the magnetic field generated by each inductor part becomes approximately the same, making the cancelling effect of the magnetic fields stronger. In the configuration of FIG. 14, none of the components are occupying the region between each of the inductor parts. Thus, it is easy to make the distance between the inductor parts belonging to the same pair shorter.

Third Embodiment

The compensation part (for example, the first compensation part, the second compensation part, the third compensation part and the fourth compensation part) of the inductor devices according to the above embodiments included a compensation capacitor. However, the compensation part of the inductor devices can include components other than the compensation capacitor. In the non-contact power charging/supplying system according to the third embodiment, the compensation part of the inductor device in the receiving side includes a rectifier circuit.

Figure 15:
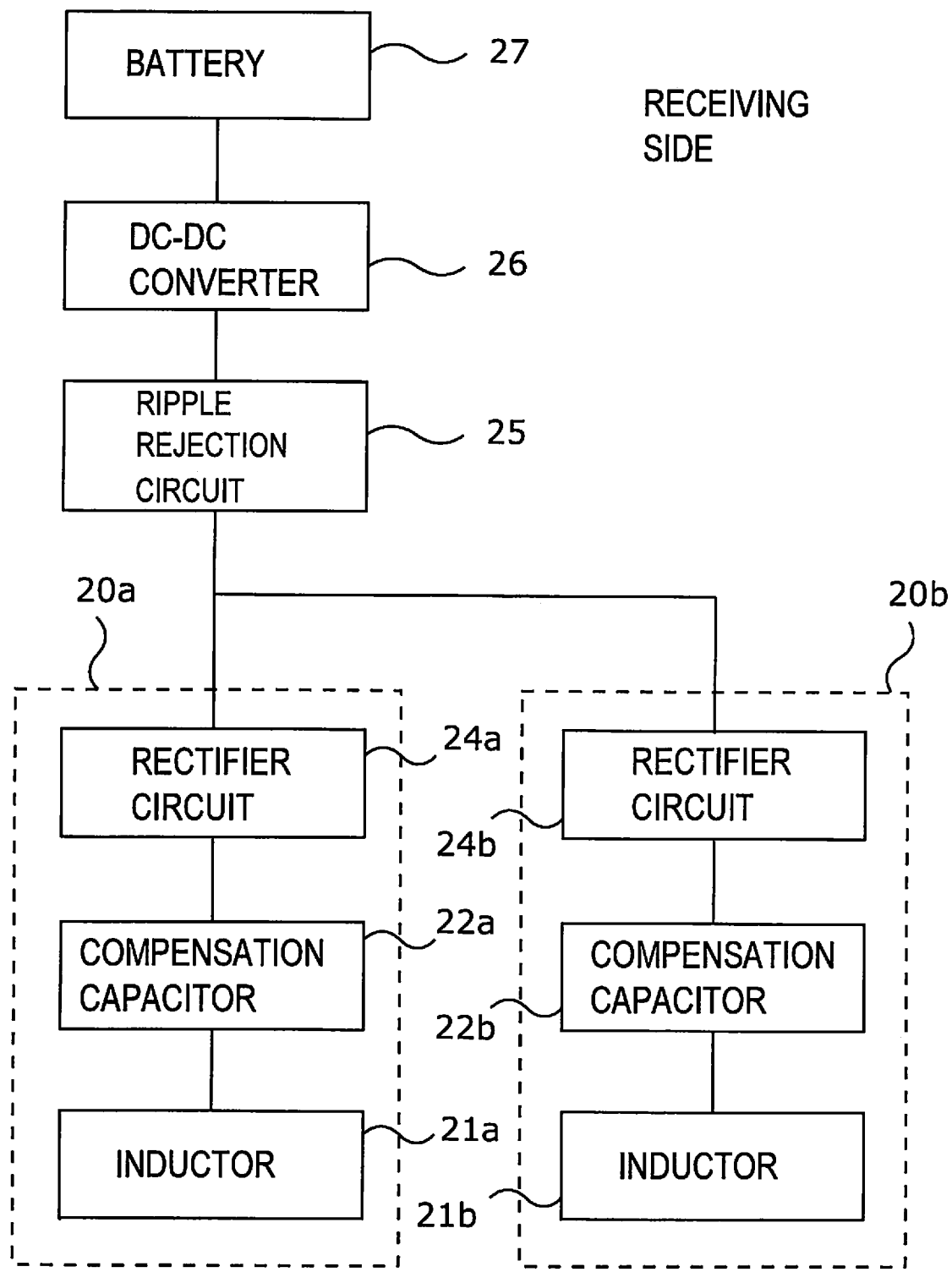
FIG. 15 is a diagram describing an example configuration of the receiving side of a non-contact power charging/supplying system according to a third embodiment.

FIG. 15 is a diagram describing an example configuration of the receiving side of a non-contact power charging/supplying system according to a third embodiment. The reception pad 20a in FIG. 15 includes an inductor 21a, a compensation capacitor 22a and a rectifier circuit 24a. The inductor 21a is located in the inductor 40a (first inductor part) described in the plan view diagrams of FIG. 10, FIG. 12 and FIG. 13. Both the compensation capacitor 22a and the rectifier circuit 24a are located in the compensation part 30a (first compensation part) described in the plan view diagrams of FIG. 10, FIG. 12 and FIG. 13.

The reception pad 20b in FIG. 15 includes an inductor 21b, a compensation capacitor 22b and a rectifier circuit 24b. The inductor 21b is located in the inductor 40b (second inductor part) described in the plan view diagrams of FIG. 10, FIG. 12 and FIG. 13. Both the compensation capacitor 22b and the rectifier circuit 24b are located in the compensation part 30b (second compensation part) described in the plan view diagrams of FIG. 10, FIG. 12 and FIG. 13.

If the configuration with four transmission/reception pads located in each inductor device is used, the rectifier circuit can be located in the compensation parts 30c, 30d, 30e and 30f in the plan view diagram of FIG. 14.

By using the above configurations, the allocation of components between the inductor parts of the inductor device can be avoided even when the rectifier circuit is located in the transmission/reception pads. Therefore, the distance between the inductor parts can be shortened, reducing the intensity of leakage magnetic fields.

Fourth Embodiment

In the non-contact power charging/supplying system according to the above embodiments, the inductor and the compensation capacitor were located on the transmission pad. However, the transmission pads do not necessary have to include both the inductor and the compensation capacitor.

Figure 16:
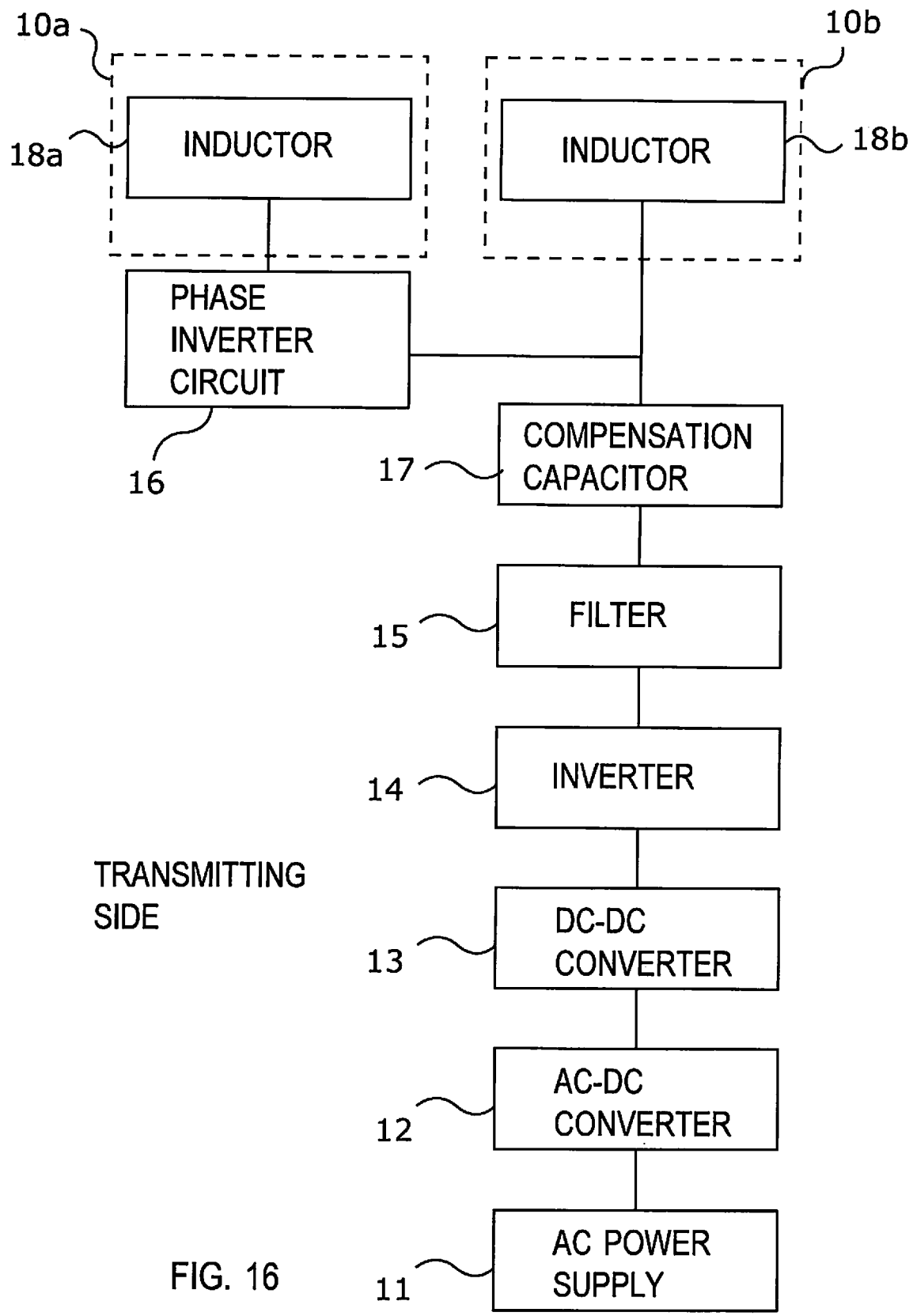
FIG. 16 is a diagram describing an example configuration of the transmitting side of a non-contact power charging/supplying system according to a fourth embodiment.

FIG. 16 is a diagram describing an example configuration of the transmitting side of a non-contact power charging/supplying system according to a fourth embodiment. In the example of FIG. 16, the compensation capacitor 17 is located in the circuit of the AC power supply 11 side instead of the transmission pads 10a and 10b. Also, the phase inverter circuit 16 is located in the AC power supply 11 side of the inductor 18a. However, if the coil of the inductor 18a is winded in the opposite direction of the coil of the inductor 18b, the phase inverter circuit 16 can be omitted.

In the example of FIG. 5, the circuit was branching at the transmission pad side of the DC-DC converter 13. However, in the example of FIG. 16, the circuit is branching at the transmission pad side of the compensation capacitor 17.

Therefore, in the example of FIG. 5, filters and inverters were implemented for each circuit branch. In the example of FIG. 16, there is one inverter and one filter (inverter 14 and filter 15). The features and configurations of other components are similar to the other embodiments.

The configuration of the receiving side of the non-contact power charging/supplying system according to the fourth embodiment is similar to the aforementioned FIG. 6 or FIG. 15. Even when the compensation capacitor is not implemented in the transmission pad of the non-contact power charging/supplying system, the power factor of the AC power signals can still be improved if the circuit of the receiving side includes a compensation capacitor.

Fifth Embodiment

In the non-contact power charging/supplying system according to the above embodiments, the inductor and the compensation capacitor were located on the reception pad. However, the reception pads do not necessary have to include both the inductor and the compensation capacitor.

Figure 17:
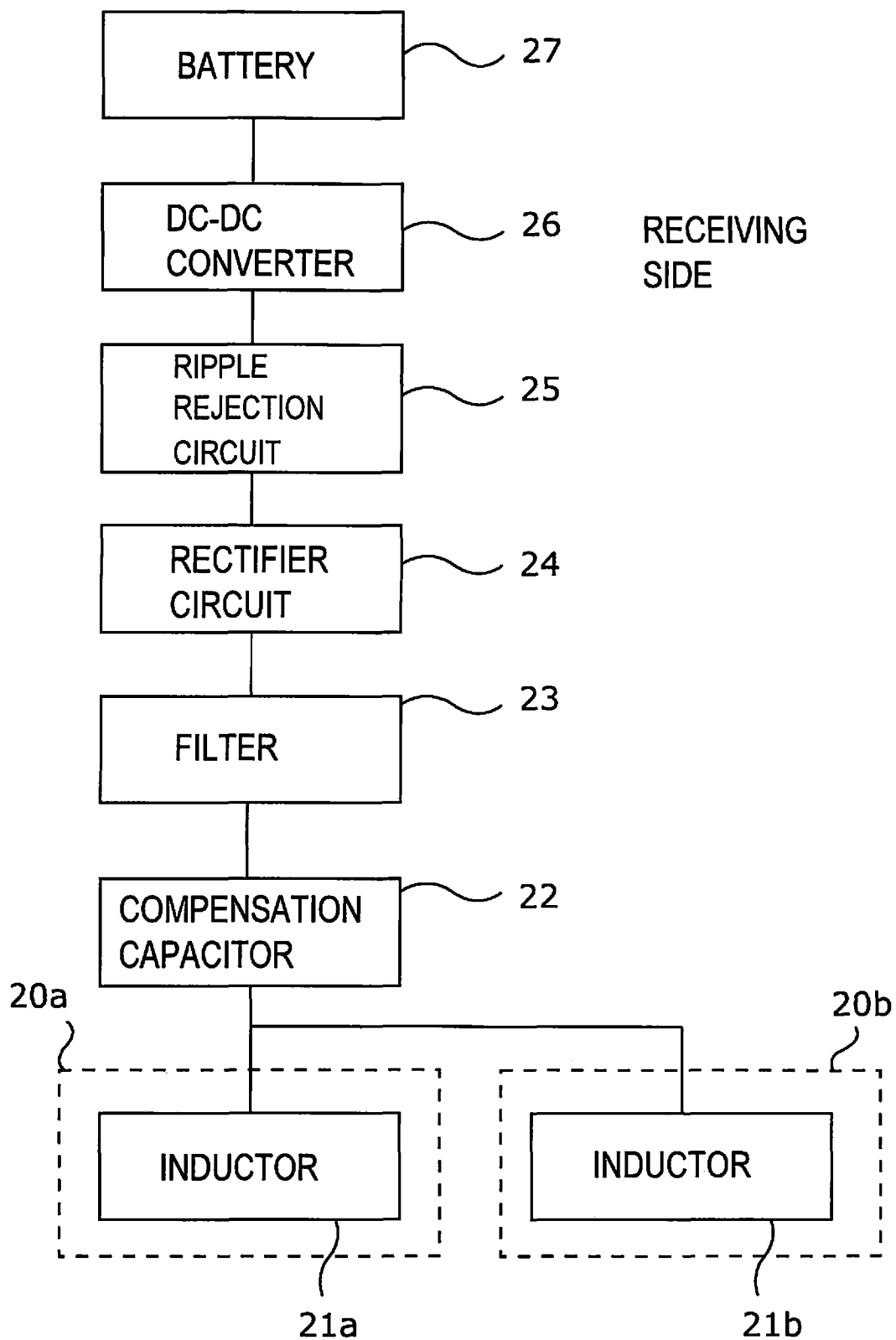
FIG. 17 is a diagram describing an example configuration of the receiving side of a non-contact power charging/supplying system according to a fifth embodiment.

FIG. 17 is a diagram describing an example configuration of the receiving side of a non-contact power charging/supplying system according to a fifth embodiment. The reception pad 20a of FIG. 17 does not have a compensation capacitor. Similarly, the reception pad 20b of FIG. 17 does not have a compensation capacitor. However, the compensation capacitor 22 is implemented between the reception pads 20a, 20b (inductors 21a, 21b) and the filter 23. The features and configurations of other components are similar to the above embodiments.

The configuration of the transmitting side of the non'-contact power charging/supplying system according to the fifth embodiment is similar to the aforementioned FIG. 5. Even when the compensation capacitor is not implemented in the reception pad of the non-contact power charging/supplying system, the power factor of the AC power signals can still be improved if the circuit of the transmitting side includes a compensation capacitor.

Sixth Embodiment

The cores of the inductor parts in FIG. 2 and FIG. 8 were continuous objects. However, the cores of the inductor parts do not necessary need to be continuous objects. Instead, the cores can be a combination of a plurality of parts. In the non-contact power charging/supplying system according to the sixth embodiment, the cores of the inductor part is divided into a plurality of parts.

Figure 18:
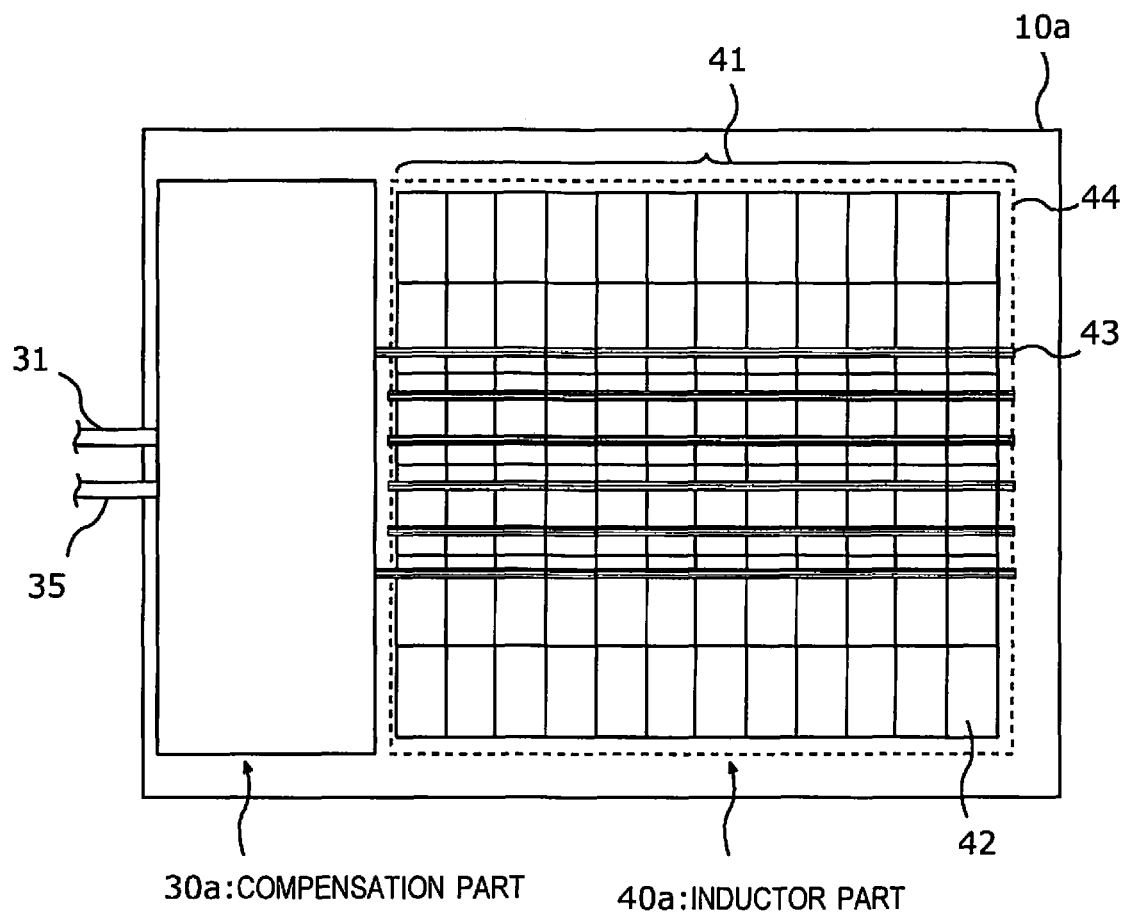
FIG. 18 is a plan view diagram describing a detailed configuration example of the transmission/reception pad according to a sixth embodiment.

FIG. 18 is a plan view diagram describing a detailed configuration example of the transmission/reception pad according to a sixth embodiment. The inductor part 40a of the transmission pad 10a in FIG. 18 includes a core 41. The core 41 is formed by combining a plurality of block cores 42. The block cores 42 can be formed by magnetic materials. Examples of magnetic materials include ferrite and ferrite and electrical steel sheets. However, the type of magnetic material is not limited. Also, the block cores 42 can be formed with any other material.

Examples of the shape of the block cores include approximately hexagonal prism shapes and approximately hexahedral shapes. However, the shape of the block cores is not limited. Also, the size of the block cores and the aspect ratios are not limited. In the sixth embodiment, approximately plate-shaped (tile shaped) block cores are combined to form the core. The features and configurations of other components in the non-contact power charging/supplying system according to the sixth embodiment are similar to the above embodiments.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:

1. An inductor device comprising:
a first pad including a first compensation capacitor located in a first direction side and a first core and a first coil winded around the first core located in a second direction side, the second direction being an opposite direction of the first direction, the first compensation capacitor being coupled with the first coil, and the first coil being configured to perform one of:
generating a magnetic field based on a first current flowing through the first coil and coupling the magnetic field with a first target coil of a target inductor device to transmit an electric power, the first current having a first phase, or
coupling with a first target coil of a target inductor device via a magnetic field from the first target coil to generate a first current depending on the magnetic field through the first coil to receive an electric power, the first current having a first phase; and
a second pad including a second compensation capacitor located in the second direction side and including a second core and a second coil winded around the second core located in the first direction side, the second compensation capacitor being coupled with the second coil, and the second coil being configured to perform one of:
generating a magnetic field based on a second current flowing through the second coil and coupling the magnetic field with a second target coil of the target inductor device to transmit an electric power, the second phase being an inverse phase of the first phase, or
coupling with a second target coil of the target inductor device via a magnetic field from the second target coil to generate a second current depending on the magnetic field through the second coil to receive an electric power, the second phase being an inverse phase of the first phase.

2. The inductor device according to claim 1, wherein the first coil is winded in either the first direction or the second direction when viewed from a first plane approximately parallel to both the first direction and the second direction, and the second coil is winded in either the first direction or the second direction when viewed from the first plane.

3. The inductor device according to claim 1, wherein the first pad and the second pad are approximately parallel to a first plane, and the first plane is approximately parallel to both the first direction and the second direction.

4. The inductor device according to claim 1, wherein
the first pad and the second pad are located in a first plane, and the first plane is approximately parallel to both the first direction and the second direction.

5. The inductor device according to claim 1, further comprising:
a first rectifier circuit coupled with the first compensation capacitor; and
a second rectifier circuit coupled with the second compensation capacitor.

6. The inductor device according to claim 1, wherein
the second pad is located in the second direction side of the first pad.

7. The inductor device according to claim 1, wherein
the first pad is located in a third direction side, the second pad is located in a fourth direction side, the third direction is perpendicular to both the first direction and the second direction, and the fourth direction is the opposite direction of the second direction.

8. The inductor device according to claim 1, wherein
a direction of a first magnetic flux generated by the first coil and the direction of a second magnetic flux generated by the second coil are approximately parallel.

9. A non-contact power charging/supplying system comprising:
a first inductor device located in a transmitting side; and
a second inductor device located in a receiving side, wherein
the first inductor device and the second inductor device is an inductor device according to claim 1.

10. A non-contact power charging/supplying system comprising:
a first inductor device located in either a transmitting side or a receiving side, the first inductor device is an inductor device according to claim 1; and
a second inductor device located in an opposite of the first inductor device, the second inductor device is the inductor device according to claim 1 without the first compensation capacitor and the second compensation capacitor.

11. An electric vehicle comprising:
an inductor device according to claim 1; and
a secondary battery electrically connected to the inductor device.

12. An inductor device comprising:
a first pad including a first compensation part located in a first direction side and a first inductor part located in a second direction side, the second direction is an opposite direction of the first direction; and
a second pad including a second compensation part located in the second direction side and a second inductor part located in the first direction side, wherein
the first compensation part and the second compensation part each include a compensation capacitor, the first inductor part includes a first core and a first coil winded around the first core, and the second inductor part includes a second core and a second coil winded around the second core,
the first pad and the second pad are approximately parallel to a first plane, and the first plane is approximately parallel to both the first direction and the second direction;
a third pad including a third compensation part located in a third direction side and a third inductor part located in a fourth direction side, the fourth direction is an opposite direction of the third direction which is perpendicular to both the first direction and the second direction; and
a fourth pad including a fourth compensation part located in the fourth direction side and a fourth inductor part located in the third direction side, wherein
the third compensation part and the fourth compensation part both include the compensation capacitor, the third inductor part includes a third core and a third coil winded around the third core, the fourth inductor part includes a fourth core and a fourth coil winded around the fourth core, the third coil is winded in either the third direction or the fourth direction when viewed from a first plane approximately parallel to both the first direction and the second direction, the fourth coil is winded in either the third direction or the fourth direction when viewed from the first plane, the third pad is located in a first location which is in the third direction side of the first pad and the first direction side of the second pad, and the fourth pad is located in a second location which is in the fourth direction side of the second pad and the second direction side of the first pad.

13. The inductor device according to claim 12, wherein
a direction of a first magnetic flux generated by the first coil and the direction of a second magnetic flux generated by the second coil are approximately parallel.

14. The inductor device according to claim 12, wherein
a direction of a third magnetic flux generated by the third coil and the direction of a fourth magnetic flux generated by the fourth coil are approximately parallel.

15. The inductor device according to claim 12, wherein
the third compensation part and the fourth compensation part each include a rectifier circuit.

* * * * *